(12) United States Patent
Garvey et al.

(10) Patent No.: US 11,816,573 B1
(45) Date of Patent: Nov. 14, 2023

(54) ROBUST SYSTEMS AND METHODS FOR TRAINING SUMMARIZER MODELS

(71) Applicant: Wevo, Inc., Boston, MA (US)

(72) Inventors: Dustin Garvey, Exeter, NH (US); Janet Muto, Boston, MA (US); Nitzan Shaer, Newton, MA (US); Shannon Walsh, Boston, MA (US); Alexa Stewart, Andover, MA (US); Andrea Paola Aguilera Garcia, Cambridge, MA (US); Kim Coccoluto, Wakefield, MA (US); Sara Peters, Syracuse, NY (US); Ruthie McCready, Austin, TX (US); Kelly Lyons, Boston, MA (US); Melany Carvalho, Pawtucket, RI (US); Everett Granger, Virginia Beach, VA (US); Julia McCarthy, Boston, MA (US); Frank Chiang, Boston, MA (US); Alexander Barza, Cambridge, MA (US); Hannah Sieber, Mendon, MA (US)

(73) Assignee: Wevo, Inc., Boston, MA (US)

(*) Notice: Subject to any disclaimer, the term of this patent is extended or adjusted under 35 U.S.C. 154(b) by 0 days.

(21) Appl. No.: 18/306,035

(22) Filed: Apr. 24, 2023

(51) Int. Cl.
*G06N 3/08* (2023.01)

(52) U.S. Cl.
CPC ..................... *G06N 3/08* (2013.01)

(58) Field of Classification Search
CPC ........................................................ G06N 3/08
See application file for complete search history.

(56) References Cited

U.S. PATENT DOCUMENTS

2018/0293908 A1* 10/2018 Wang ................. G06V 30/333

FOREIGN PATENT DOCUMENTS

| CA | 3080754 A1 | * | 11/2021 | ............ A47C 27/083 |
| CN | 112818256 A | * | 5/2021 | ......... G06F 16/9535 |
| CN | 113656562 A | * | 11/2021 | |
| CN | 115129858 A | * | 9/2022 | |

* cited by examiner

*Primary Examiner* — Xin Jia
(74) *Attorney, Agent, or Firm* — Invoke

(57) ABSTRACT

Techniques are described for producing machine learning models to generate findings associated with user experiences with products and/or services. In some embodiments, a training process receives a set of findings from one or more user experience tests, where a finding includes a summary and a set of one or more references supporting the summary. The training process further identifies a supplemental set of one or more references that were not included in the initial finding to support the summary. The training process trains a machine learning model, such as a neural or generative language model, based on the first set of one or more references and the second set of one or more references to generate summaries from a subset of sampled references based at least in part on the first set of one or more references and the second set of one or more references.

20 Claims, 15 Drawing Sheets

402

| Dashboard |
| Key Findings |
| Expectations |
| Diagnostics |
| Sentiment Map |
| Custom Questions |

400

404

Respondents report that the page is easily navigable, providing helpful information that educates them about product design

- This page is use friendly, straightforward, and organized by topics that answer the questions that visitors may have:
  - *"It is well planned and presented. It answers a lot of questions people have and provides a lot of information. It is user friendly"* (Diagnostics, First Impression)
  - *"The page was organized in such a way that I could easily locate information, and the content was written in an easy to understand format."* (Diagnostics, Intuitive)

- A small proportion of viewers felt that the page is not unique or crowded with too much information

Respondents are engaged by the positive imagery, in addition to the product information and details; however, the banner image can be a deterrent for a small cohort

- The image and video that show people smiling while using the product resonate with viewers::
  - *"The testament of the product user was encouraging"* (Page 1, Sentiment Map, Likes)
  - *"Smiling people happy with product."* (Diagnostics, First Impression)

- The banner image is off-putting to a small number of respondents:
  - *"The user's engagement with product doesn't quite look natural"* (Page 1, Sentiment Map, Dislikes)

FIG. 4

ROBUST SYSTEMS AND METHODS FOR TRAINING SUMMARIZER MODELS

RELATED APPLICATIONS; INCORPORATION BY REFERENCE

This application is related to U.S. application Ser. No. 17/991,252, titled "Artificial Intelligence Based Theme Builder for Processing User Expectations", which is hereby incorporated by reference.

TECHNICAL FIELD

The present disclosure relates, generally, to user experience testing. In particular, the present disclosure relates to selecting, curating, normalizing, enriching, and synthesizing the results of user experience tests.

BACKGROUND

User experience (UX) design encompasses tools and applications for optimizing how users interact with a system, which may be comprised of physical and/or digital interfaces. Component tools allow designers and researchers to compose and administer UX tests, the results of which may be processed to assess and understand user experiences with a product. For example, the component tools may allow a user to compose and administer a survey or questionnaire that prompts a sample set of users to describe and/or otherwise evaluate the user's experience with a product. A UX test may also be composed to monitor and capture various metrics associated with a user's interaction with a product, such as how long it takes the user to perform a certain task and how long a user engages with the product. Test results may include qualitative and quantitative data that provide insights into user experiences with a product. Such insights may help isolate problematic areas of a product's design and guide product design updates to improve the overall experience when using a product.

User researchers and product designers generally have two options when performing UX testing. The first is to compose and administer the tests using existing or custom-built frameworks. For example, a framework may allow users to create custom survey questions and target a panel with particular demographics. In this scenario, the researcher bears the burden of determining how the tools should be composed and how the results should be analyzed. The researcher may not have the time or expertise to effectively run UX tests and identify the highest-quality test results. Poorly crafted tests and analysis may lead to suboptimal product design choices and the inefficient use of resources.

Researchers may also outsource UX testing to a third-party service provider. In this scenario, the service provider may use proprietary tools to perform the UX tests and analyze the results. Third-party service providers may leverage their expertise in conducting and administering tests. However, it may be difficult for service providers to identify the test results that are most relevant to the specific customer. The analysis is often decomposed into manual tasks that are tightly coupled to the specific customer. As a result, extracting useful and actionable insights is typically an expensive, cumbersome, and inefficient process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example user interface for navigating between different findings that were discovered through machine learning processing in accordance with some embodiments;

DETAILED DESCRIPTION

Figure 1:
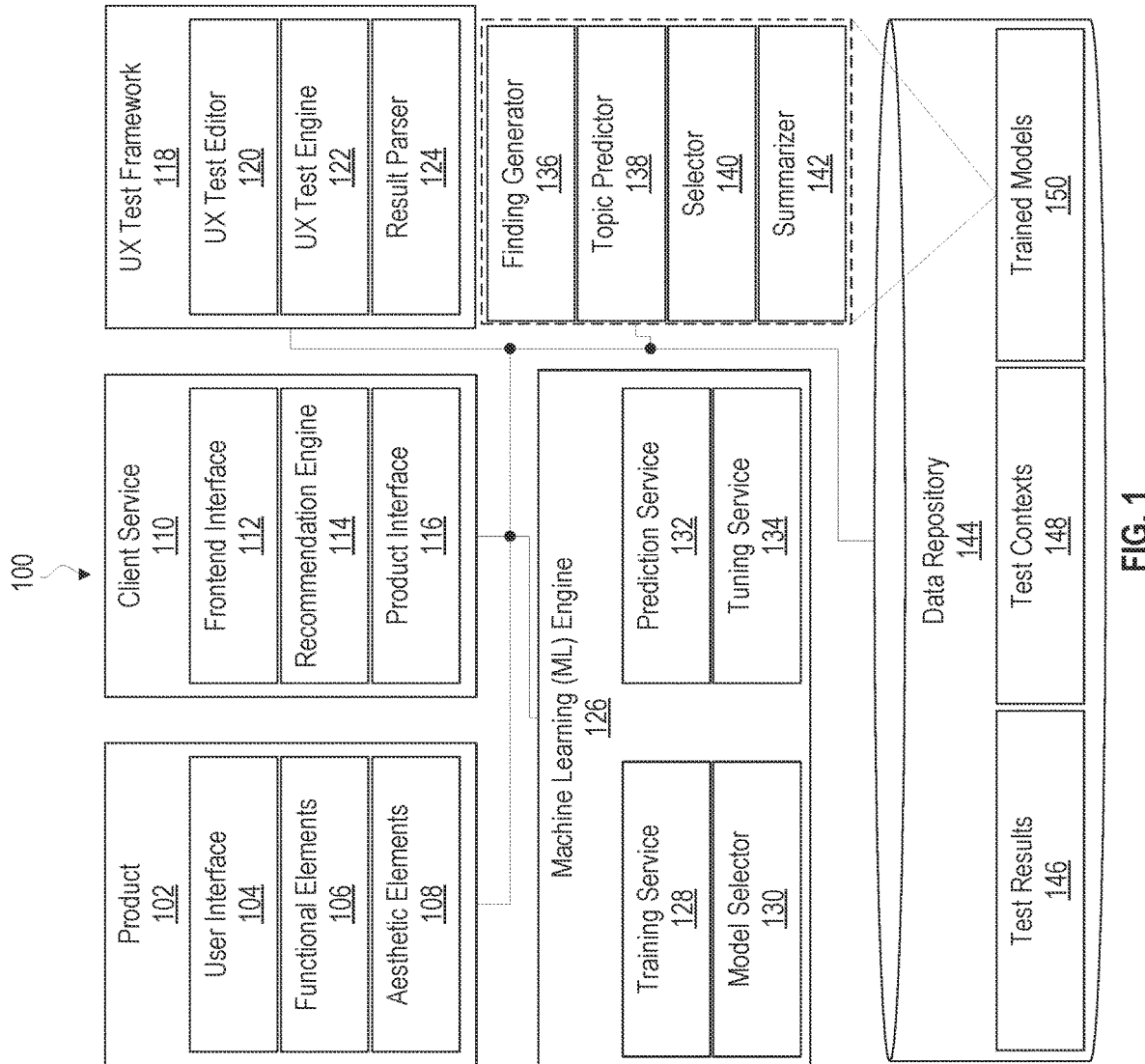
FIG. 1 illustrates a scalable system architecture for discovering and summarizing user experience test results in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

Techniques are described herein for selecting, curating, normalizing, enriching, and synthesizing the results of user experience (UX) tests. The techniques may automate one or more aspects of UX testing, increasing the scalability of UX testing systems and methodologies. The techniques may further provide insights into UX test results that are not readily apparent from the raw result data. The insights may be used to render user interfaces and/or to trigger other system actions, which may optimize product design feedback, analysis, and development process flows.

In some embodiments, a system receives, normalizes, and synthesizes a set of test result elements collected from a set of one or more UX tests. A test result element, as used herein, includes data stemming from the outcome of a user experience test. Test result elements may be qualitative or quantitative in nature. Qualitative test results may include quotations, case studies, and/or other written text that is descriptive and generated based on observations, opinions, and/or user interpretations of user's experience with the product under test. Qualitative data may be used to identify patterns or themes that are not easily quantifiable. Quantitative results are based on numerical data that may be measured and analyzed using statistical methods. Quantitative data may measure or otherwise quantify various facets of a user experience, which may be useful to benchmark and compare the performance of a product relative to peers in the same or similar product space.

In some embodiments, the system consumes UX test results and generates automated findings to highlight areas that are predicted to provide the most insight into optimizing a product's design. A finding may be generated based on all or a subset of the UX test result elements, including qualitative and/or quantitative data contained therein. A finding may summarize a subset of the UX test results that are interrelated. A finding may link the summary to one or more references extracted from the set of UX test results to show support for the machine-generated insights in the underlying raw test data. Machine-generated findings reports may provide near instantaneous guidance for optimizing product designs while removing extraneous information from a vast quantity of raw test result data. As a result, the system may avoid wasting resources that would otherwise be dedicated to processing such data, thereby increasing system efficiency and scalability.

In some embodiments, the system includes an artificial-intelligence (AI) engine that leverages machine learning (ML) to learn to generate findings from UX test results without being explicitly programmed to do so with specific rules or instructions. The AI engine may train one or more ML models to learn and improve performance on one or more tasks related to generating findings. For example, a trained ML model may extrapolate from learned patterns to distinguish between high and low-quality UX test results, discover topics present within a new set of UX test results, and/or summarize the topics that are present. The system may further use machine learning to adapt to changing conditions across different domains without requiring a developer to update the underlying system code. In response to feedback, the AI engine may update one or more model parameters. The system may further train or retrain a model using data that is local in time such that the model "forgets" data that is older than a threshold age. Thus, the system may pick up on trending and evolving patterns as the standards and expectations for user experiences change over time.

In some embodiments, the system trains ML models by parsing historical test key findings to create summary-reference pairs. The system may augment the training data by supplementing a summary-reference pairs with relevant and semantically similar references even though the references were not included in the initial set of key findings. Using the augmented summary-reference pairs, the system may then train a language model to generate summaries from a subset of sampled references.

In some embodiments, the machine-generated findings may be driven through quantitative split analysis and segmentation. According to a quantitative split driven model, the system may generate a plurality of different test result selection and evaluation permutations. For each permutation, the system may compute confidence intervals for various selected quantitative measures. The system may then retain statistically significant and distinct permutations, as determined based on the confidence intervals, and discard the other permutations from the model. Retained permutations may be consolidated and used to summarize findings for a collection of test results.

In some embodiments, the system executes one or more operations based on the machine-generated findings. Examples include rendering user interfaces, populating work queues for further review by an analyst, generating analytics with respect to the strengths and/or weaknesses of a product's design, recommending/deploying updates to a product, and/or prioritizing actions/resources directed to updating the product. The techniques may reduce the turnaround time from receiving UX test results to identifying and implementing actionable insights for improving a product's design.

One or more embodiments described in this Specification and/or recited in the claims may not be included in this General Overview section.

2. SYSTEM ARCHITECTURE

FIG. 1 illustrates a scalable system architecture for discovering and summarizing user experience test results in accordance with some embodiments. As illustrated in FIG. 1, system architecture 100 includes product 102, client service 110, user experience (UX) test framework 118, machine learning (ML) engine 126, finding generator 136, topic predictor 138, selector 140, summarizer 142, and data repository 144. In some embodiments, system architecture 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Product 102 refers to an item or service with which users may interact. Examples include articles of manufacture, software applications, cloud computing services, websites, virtual assistants, and other computing-based systems. Product 102 includes user interface 104 for interacting with one or more users. In the context of a computing system, service, or application, user interface 104 may render user interface elements and receive input via user interface elements. Example user interfaces include a graphical user interface (GUI), a command line interface (CLI), a haptic interface, and a voice command interface. Example user interface elements include checkboxes, radio buttons, dropdown lists, list boxes, buttons, toggles, text fields, date and time selectors, command lines, sliders, pages, and forms. User interfaces for other types of products may include buttons, levers, knobs, dials, and/or other physical elements through which a user may manipulate and interact with product 102.

In some embodiments, product 102 includes functional elements 106 and aesthetic elements 108, which may affect the user experience with respect to product 102. Functional elements 106 may include user interface controls through which the user may operate product 102 and/or affect the output of product 102. Functional elements 106 may further comprise backend processes and/or systems with which a user does not directly interact, but which may affect a user's experience with product 102, such as a perceived responsiveness or quality of product 102. Aesthetic elements 108 may generally comprise nonfunctional components of product 102 including the look and feel of user interface 104 and/or other visual design elements of product 102.

UX test framework 118 includes components for composing and running UX tests. The components may include UX test editor 120, UX test engine 122, and result parser 124. A UX test may comprise applications, tools, and/or processes for evaluating the performance of various facets of one or more user experiences with product 102. For example, a UX test may comprise a survey or questionnaire. Users of a website or a mobile application may be prompted to complete the UX test to evaluate their experience with product 102, which may be the website or application itself or a separate product. If the user accepts the prompt, the user may be redirected to a webpage with a set of queries to describe and/or rank various facets of the user experience with product 102.

Additionally or alternatively, a UX test may obtain performance data for one or more UX facets using mechanisms for tracking how a user interacts with product 102. For example, scripting tags that embed executable code in a website or backend processes, such as daemons, may track and collect metrics and/or other information about user interactions with product 102. Example metrics may include how long it takes a user to first interact with a user interface element, how long it takes a user to complete a function, how long a user engages with product 102, how long it takes for pages of user interface 104 to load, which products features are most frequently accessed, and which product features are least frequently accessed.

Additionally or alternatively, a UX test may obtain information about user experiences from other data sources. For example, a web scraper may crawl one or more websites for user reviews of a product to extract information about which product features are viewed most positively, which product features are viewed most negatively, what scores have been assigned for different features of the product, and what overall product score has been assigned. Additionally or alternatively, the UX test may scrape social media sites for posts tagged with a product identifier and extract information from the posts about how users interact with the product. In yet another example, a UX test may search customer databases and/or other sources to determine what percentage of users have returned a product, submitted a customer support ticket, or submitted a product complaint. A UX test may assign scores based on the extracted information using a scoring function or machine learning, where a UX test score quantifies one or more user experiences with respect to one or more facets of the user experience. Although only one product is illustrated in FIG. 1, a given UX test may be run for several different products and several different UX tests may be run for the same product.

UX test editor 120 is a tool through which users may compose and customize UX tests. For example, UX test editor 120 may include one or more GUI elements through which a user may select predefined survey questions, input new questions, define scripts for capturing performance metrics, and/or otherwise customize test applications to evaluate user experiences with product 102. UX test editor 120 may further allow users to define parameters associated with running a UX test, such as what segment to target, what platform to use running the test, and/or other parameters controlling how the UX test is run.

UX test engine 122 runs tests defined through UX test editor 120. A UX test may include a query mechanism to prompt or search for data describing or quantifying one or more facets of a user experience. For example, UX test engine 122 may prompt a sample set of visitors to a webpage to complete a survey describing and/or ranking various facets of a user experience with product 102. As another example, UX test engine 122 may capture webpage usage metrics from the set of visitors using scripting tags and/or scrape review sites for information describing product 102, as previously described. The tests may be run in accordance with the parameters input through UX test editor 120. The results of a UX test may include qualitative elements describing the user experience and/or quantitative elements that quantify the user experience.

In some embodiments, a UX test allows users to input unstructured and/or structured qualitative data describing the user's experience with product 102. For instance, a UX test may prompt a user to respond to custom-defined questions that were created by a test administrator. A "custom" test result element may include the user's response (qualitative and/or quantitative) to one or more of the custom questions. Additionally or alternatively, a UX test may capture diagnostic results based on the qualitative inputs describing a facet of the user experience and/or quantitative inputs measuring the facet of the user experience.

Additionally or alternatively, UX tests may capture expectation elements, which may include an "expectation quote" that describes the user's expectations without being confined to a schema, an "outcome quote" that describes the outcome for an associated expectation (also without being confined to a schema), and an outcome selected from a predefined schema (e.g., "fully met", "somewhat met", "unmet", etc.). The triplet of the unstructured expectation quote, unstructured outcome quote, and selected outcome may be part of an expectation element collected by UX test framework 118. A UX test may collect one or more expectation elements from one or more users. In other embodiments, an expectation element may include additional information associated with a user's expectations with product 102 and/or may omit one or more items from the triplet.

Additionally or alternatively, UX tests may capture heatmap elements, which may include qualitative and/or quantitative test result data that is tied to a particular location within a webpage or application page. Heatmap data may be captured by the user selecting a particular area within a page and inputting qualitative and/or quantitative data that is associated with the selected page region. For example, the user may input one or more quotations that describes a positive attribute and/or a negative attribute of a particular user interface element on the page. As another example, the user may be prompted to input a score representing a perceived effectiveness or quality of the user interface element.

Result parser 124 parses the results of UX tests to extract test result elements from the administered UX tests. For example, result parser 124 may extract diagnostic results, custom question responses, heatmap data, expectation quotes, outcome quotes, and associated outcomes. Result parser 124 may further extract additional information about individual UX test responses and/or groups of UXT test responses, including attributes about the author of a quotation and what quantitative score the respondent gave to a facet of the user experience that is relevant to a quotation.

ML engine 126 is an AI-driven engine that uses machine learning to build models based on sample UX test data. ML engine 126 may include training service 128 for building the set of ML models, model selector 130 for selecting ML models to apply based on context, prediction service 132 for applying ML models to results extracted by result parser 124, and tuning service 134 to make runtime adjustments to ML models based on feedback.

In some embodiments, ML engine 126 trains, tunes, and applies a set of models, which may include finding generator 136, topic predictor 138, selector 140 and/or summarizer 142. Finding generator 136 may orchestrate machine-generation of findings based on an input set of test results. Generating a findings report may include discovering topics that are predicted to most relevant/insightful to a given task (e.g., design optimization), summarizing the topics, and selecting references to support each finding.

In some embodiments, topic predictor 138 is trained or otherwise configured to discover one or more topics within a set of test results, selector 140 is trained or otherwise configured to identify references with a threshold level of quality within the test results that support a topic, and summarizer 142 is trained or otherwise configured to generate a summary for a topic given a set of supporting references. Topic predictor 138, selector 140, and summarizer 142 may be implemented as independent components or subcomponents of finding generator 136. Techniques for training and applying these models are described in further detail below.

Data repository 144 stores and fetches data including test results 146, test contexts 148, and trained models 150. In some embodiments, data repository 144 is any type of storage unit and/or device (e.g., a file system, database, collection of tables, or any other storage mechanism) for storing data. Further, data repository 144 may include multiple different storage units and/or devices. The multiple different storage units and/or devices may or may not be of the same type or located at the same physical site. Further, data repository 144 may be implemented or executed on the same computing system as one or more other components of system architecture 100. Alternatively or additionally, data repository 144 may be implemented or executed on a computing system separate from one or more other system components. Data repository 144 may be communicatively coupled to remote components via a direct connection or via a network.

Client service 110 may comprise applications, tools and systems used by product designers and/or third-party service providers that run specialized UX tests. In some embodiments, client service 110 comprises frontend interface 112, recommendation engine 114, and product interface 116. Frontend interface 112 may comprise a user interface for presenting analytics, recommended actions, and/or other information based on the predictions. For example, frontend interface 112 may generate and render interactive charts that allow a user to compare predicted UX test scores for product 102 to performance benchmarks and view the most relevant test themes and representative expectation elements. The user may view which facets are underperforming relative to peer products, the most informative machine-generated findings impacting a product's performance, and recommended actions to address the problems.

Recommendation engine 114 may comprise logic for generating recommendations. For example, recommendation engine 114 may determine which facets are underperforming and which solutions are predicted to improve performance with respect to the facet. Recommendation engine 114 may leverage the machine-generated findings to generate the recommendations. For instance, recommendation engine 114 may learn patterns within the findings and UX benchmarks for various products. Recommendation engine 114 may apply a trained model to a set of representative findings for product 102 to recommend product updates that are predicted to improve the product's benchmark scores.

Product interface 116 may be communicatively coupled to product 102 and allow client service 110 to invoke and/or execute functions on product 102. For example, product interface 116 may include an application programming interface (API) endpoint to send requests to a software application or a service to execute a requested change in the user interface. As another example, product interface 116 may invoke an editor to change a webpage associated with product 102. The requests and functions that are invoked may be directed to improving underperforming facets of product 102.

The components illustrated in FIG. 1 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components illustrated in FIG. 1, may be implemented as a cloud service or a microservice application. Tenants may subscribe to a cloud service to navigate automatically generated finding reports, track UX benchmark scores of a product, view the most helpful qualitative data highlighting the product design features that excelled or underperformed, and implement recommended actions to improve the product design. Additional embodiments and examples relating to computer networks are described below in Section 8, titled Computer Networks and Cloud Networks. Additional embodiments and examples relating to computer networks are described below in Section 9, titled Microservice Applications.

3. FINDING GENERATION

In some embodiments, finding generator 136 is configured to generate a findings report comprising one or more findings associated with an input set of test results. A finding may include multiple elements. Example elements of a finding may include:

ID: A value that uniquely identifies the finding;

Summary: A natural-language description, created by rules or a fine-tuned ML language model, of a pattern within the raw test results;

Quotes: A set of one or more quotations that are relevant to the finding;

References: A subset of the Quotes that have been conditioned-decorated to be analyst facing and may include supplementary information such as statistical significance; and Children: A set of sub-findings created from data relevant to the parent finding.

A findings report may provide insights into a product's design including isolating the strongest and/or most problematic facets of the design. The findings report may be a structured document, such as a document conforming to a markup language, that stores one or more of the elements above for each finding. The structured document may be hierarchical in nature, with a parent finding having one or more children. The hierarchy may run multiple levels deep with a child finding also being a parent of one or more other findings.

The process of generating a finding may vary for different types of UX test elements. For example, the process of generating a finding from a custom test question may vary between diagnostic test elements, expectation test elements, and heatmap elements. The system may include different types of finding generators that encapsulate different logic for generating automated findings based on the type of result elements detected within a UX test.

Figure 2:
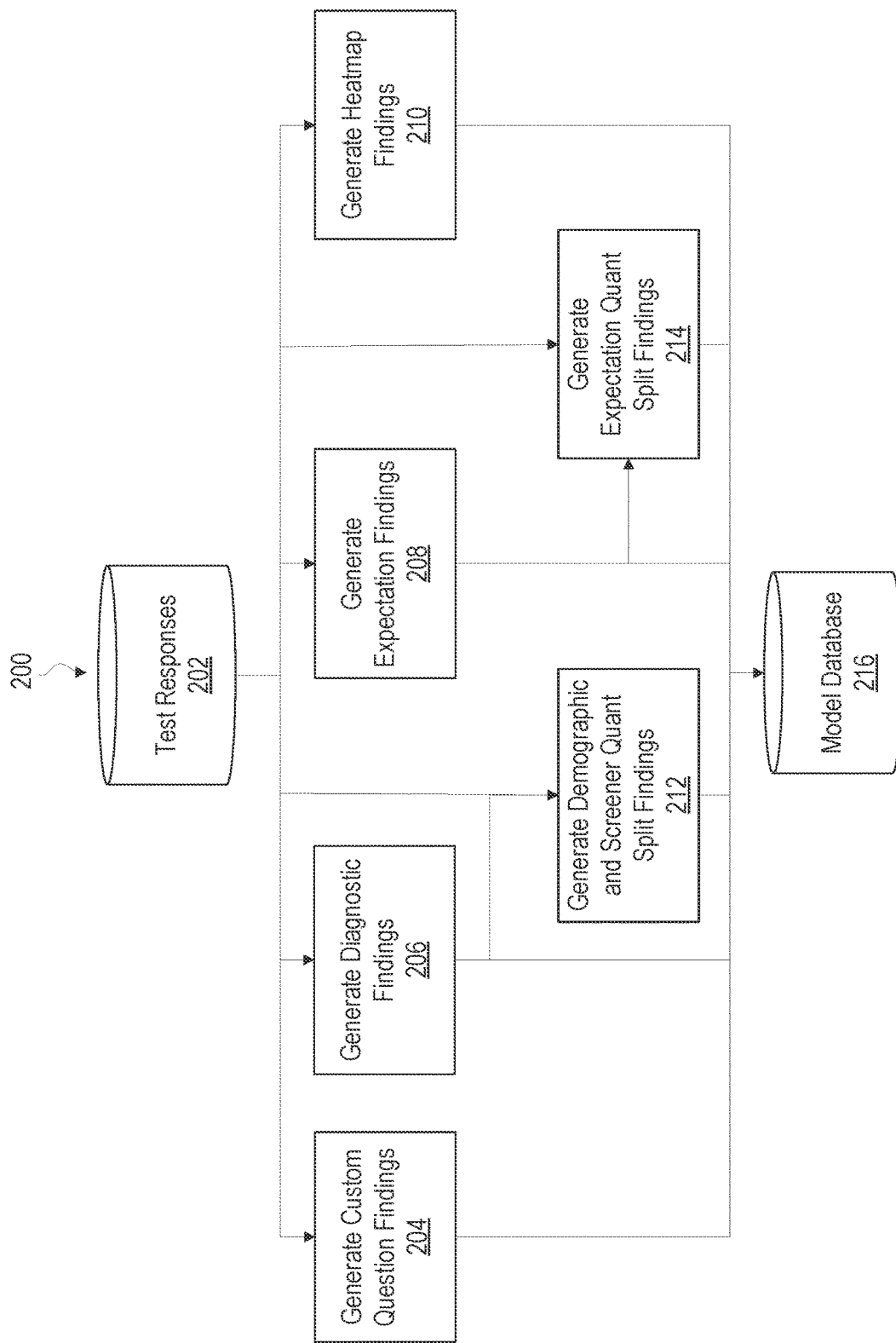
FIG. 2 illustrates an example dataflow diagram for generating findings for various elements of a user experience test in accordance with some embodiments.

FIG. 2 illustrates example dataflow diagram 200 for generating findings for various elements of a user experience test in accordance with some embodiments. Referring to dataflow diagram 200, a set of test responses 202 is received as input. Test response 202 may include the results from a plurality of respondents for the same UX test and/or a plurality of different UX tests for a given product or service. In response to receiving test responses 202, finding generator 136 may instantiate different types of generators based on the type of UX test elements contained within test responses 202. The different types of findings generators may include generators for:

Generating custom question findings (operation 204);
Generating diagnostic findings (operation 206);
Generating expectation findings (operation 208); and
Generating heatmap findings (operation 210).

The generators may be instantiated and concurrently execute the operations in parallel if test responses 202 include different types of test elements.

In some embodiments, the machine-generated findings may serve as input to generate other findings, such as to generate quantitatively driven split findings. For example, finding generator 136 may initiate one or more of the following operations:

Generating demographic and screener quant split findings (operation 212); and

Generating expectation quant split findings (operation 214).

Figure 3:
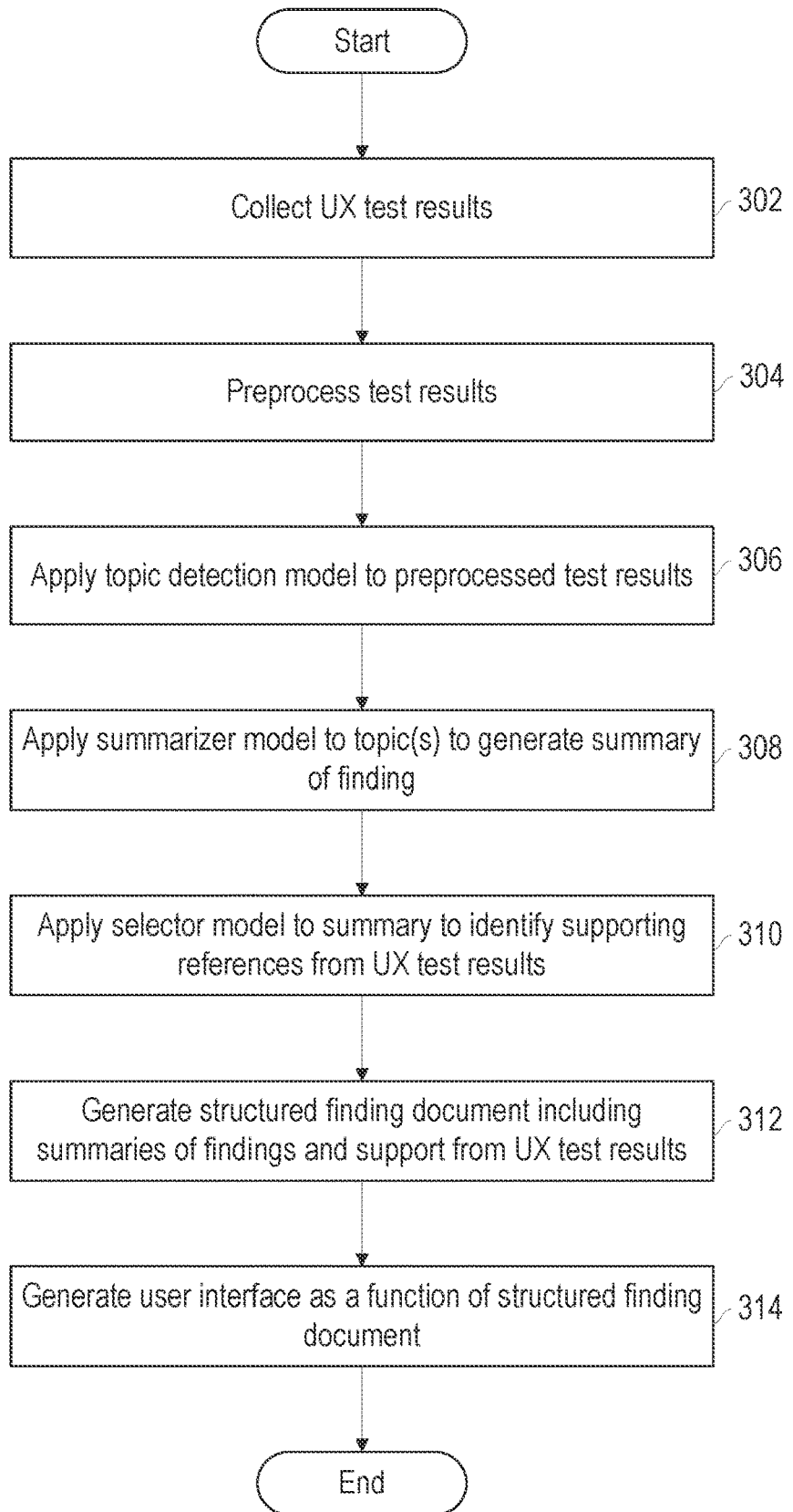
FIG. 3 illustrates an example process for summarizing test result facts in accordance with some embodiments.

FIG. 3 illustrates an example process for summarizing test result facts in accordance with some embodiments. As previously noted, the operations for generating findings may vary between different types of UX test elements and finding generators. Examples of how the operations may vary are described in the subsections below. However, FIG. 3 illustrates a generalized process for summarizing test results, which may be executed by different types of generators to produce findings. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, the system collects a set of UX test results (operation 302). For example, the UX test results may include responses to custom questions, results of diagnostic tests, expectation/outcome data, and/or heatmap data. The test result data may include qualitative data, such as quotations in an unstructured natural language format, and/or quantitative data, such as performance scores for one or more facets of a user experience with a product.

Once collected, the test results are preprocessed (operation 304). In some embodiments, preprocessing includes extracting quotations, such as diagnostic quotes, expectation quotes, outcome quotes, and quotes input via a heatmap interface. Preprocessing may further include grouping and/or filtering quotations by one or more attributes. For example, quotations may be grouped by sentiment using a trained sentiment analysis model and/or by type of UX test element where diagnostic quotes are separated from expectation quotes, outcome quotes, etc. Additionally or alternatively, quotations may be filtered based on an estimated quality score. A ML model may be trained to learn patterns that are indicative of high and low-quality quotations. If the score estimated by the ML model for a quotation is lower than a threshold, then the quotation may be removed from further processing. Thus, low-quality quotes may be detected and filtered to prevent negatively impacting the findings report.

The system next applies a topic detection model to the preprocessed test results (operation 306). For example, topic predictor 138 may be applied to detect topics in a set of quotations. In some embodiments, topic predictor 138 uses a word embedding and cluster-based model to detect topics that are present. Topic predictor 138 may segment a set of quotations based on the detected topics.

Once the topics have been detected, the system applies a summarizer model to each topic to generate a summary for a finding (operation 308). In some embodiments, the summarizer model is a generative language model that outputs a natural language summary that describes an input set of quotations associated with a detected topic. Techniques for training a summarizer model are described in Section 6.2, titled Summarizer Training. Additionally or alternatively, the system may generate finding summaries using a set of rules that map test results to descriptions and/or other summary elements.

The system further applies a selector model to identify references that support the finding from the set of UX test results (operation 310). In some embodiments, the selector model receives, as input, a set of quotations for a given topic and outputs a smaller collection of quotations that satisfy a threshold level of quality. Techniques for training a selector model for identifying references are described in Section 6.1, titled Selector Training. The system may decorate and/or link the identified references to enhance the associated finding.

The system generates a structured finding document including the summaries of findings and supporting references from the UX test results (operation 312). Additionally or alternatively, the findings may include one or more of the elements previously mentioned, such as a finding ID, list of relevant quotations, and/or child nodes.

In some embodiments, the system generates a user interface as a function of the structured finding document (operation 314). For example, the system may generate a webpage or application page that presents the findings through a GUI. The system may generate hyperlinks for the supporting references that allow the user to navigate to individual test results and confirm support for the findings.

Additionally or alternatively, the user interface may include recommendations and/or other guidance based on the findings. For example, a finding may summarize a problematic area of a product's design. The system may map the finding, using rules or machine learning, to recommended updates, services, and/or other actions that are predicted to address the problem.

FIG. 4 illustrates example user interface 400 for navigating between different findings that were discovered through machine learning processing in accordance with some embodiments. User interface 400 includes navigation pane 402, which includes links that allow the user to browse between different types of machine-generated findings. For example, the user may navigate between the following links:

Key findings: Presents the findings across all finding types that are predicted to be most useful to an analyst or product designer;

Expectation findings: Presents findings related to expectation elements of a UX test;

Diagnostic findings: Presents findings related to diagnostic elements of a UX test;

Sentiment map findings: Presents findings related to a sentiment-based heatmap of a UX test;

Custom question findings: Presents findings related to custom questions presented in a UX test.

Display pane 404 presents a finding report based on the link selected from navigation pane 402. In the example illustrated, the user has selected the key findings link. In response, navigation pane 404 presents a hierarchical findings report with two parent findings. Each parent finding is associated with two child findings: one positive and one negative. A subset of the child findings include supporting references, which include quotations and the UX test element from which the quote was extracted.

3.1 Custom Question Findings

In some embodiments, UX tests include custom questions, which allow product designers and/or other users to customize UX tests before being administered to product users. For instance, a UX test may allow a product designer to define a threshold number of custom questions to ask. Thus, the framework provides an interface through which users may create questions pertaining specifically to the company or product being tested. Custom questions may be open-ended without being confined to a particular pre-defined topic, structure, or schema. However, custom question responses generally follow one of two formats: one in which a respondent answers a question with natural language text and one in which the respondent selects one of many answers. The former is referred to as a qualitative question and the latter is referred to as a quantitative question. In the latter scenario, a follow-up question may be included to obtain qualitative data. In this scenario, the custom question is referred to as a quantitative with qualitative question. Other question types may also be defined, depending on the particular implementation.

The path for generating findings may vary depending on the type of custom question responses within the UX test results. For example, the path for generating findings for qualitative question responses may vary from the path for generating finding responses for quantitative with qualitative question responses. In the latter scenario, the finding generator may use the quantitative values to partition responses, detect topics, and/or generate finding summaries.

Figure 5:
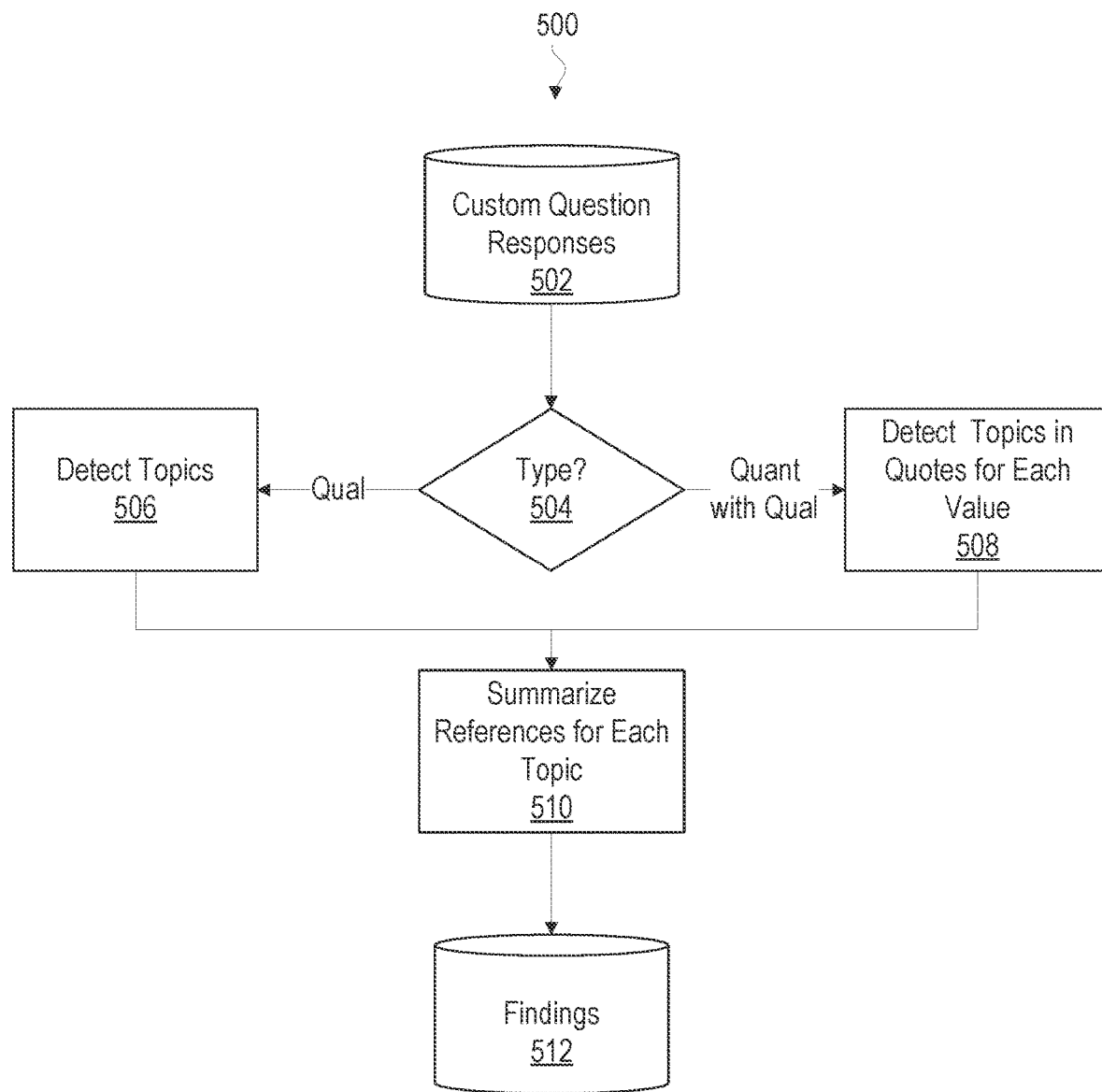
FIG. 5 illustrates an example dataflow diagram for generating custom question findings in accordance with some embodiments.

FIG. 5 illustrates example dataflow diagram 500 for generating custom question findings in accordance with some embodiments. Referring to dataflow diagram 500, the custom finding generator receives custom question responses 502 as input. In response to receiving the responses, the custom question finding generator determines the type of custom question response (operation 504). In the illustrated example, the types include qualitative or quantitative with qualitive responses. However, the custom question finding generator may generate findings for other types of custom questions, such as quantitative only questions.

For qualitative questions, the path branches to the left, and the custom question finding generator detects topics based on the qualitative responses (operation 506). With qualitative-only questions, the custom question finding generator may start with a collection of respondent quotes and detects topics in the quotes. Under this path, the custom question finding generator does not use quantitative data to perform the topic detection as the responses do not include quantitative values.

For quantitative with qualitative questions, the path branches to the right, and the custom question finding generator detects topics in quotes associated with each quantitative value (operation 508). Under this path, the custom question finding generator may partition quotes by selected values and detect the topics for each selected value based on the collection of quotes accompanying the quantitative assessment. For example, the custom question findings generator may partition quotes from respondents that assigned a particular performance score to a facet of the user experience of group all quotes where the score falls within a range of values.

Under both paths, the custom question finding generator summarizes references for each topic (operation 510). For qualitative-only questions, the summaries may describe the order and size of each detected topic. The order may be determined based on the sequence in which the topics occur within UX tests and/or the custom responses within a topic are submitted. The size of a topic may be determined in terms of the absolute quotation count value and/or the percentage of the total population of quotes that are assigned to a given topic. For quantitative with qualitative questions, the custom question finding generator may summarize the detected topics in each of the value based collections.

The custom question finding generator packages the results of the process into findings 512. The findings may include the topics and topic summaries describing the order and size of each topic. The packaging for quantitative with qualitative questions may further communicate what value based collection was used to derive the finding.

In some embodiments, the custom question finding generator does not use a model based summarizer, which may be different from other types of finding generators described herein. A ML model may not be useful for custom questions as these questions may have an unpredictable "shape." Further, custom questions often elicit simple response, and semantic clustering may allow an analyst to more quickly understand response distributions. However, in other embodiments, trained summarizer models, such as those described in further detail below, may be applied instead of or in addition to semantic clustering models.

To illustrate the custom question finding generator operations, an example is described below for purposes of clarity. Components and/or operations described below for the present example and other examples should be understood as relating to specific examples which may not be applicable to certain embodiments. Accordingly, components and/or operations described with respect to each specific example herein should not be construed as limiting the scope of any of the claims. With respect to the example, the customs finding generator may output the following findings for a set of input UX test responses to a qualitative custom question with the label CQ5:

Fifth, respondents were asked: "How does this page compare to other apps you use for food delivery?"
    CQ 5, Topic 1: 24 quotes (20%)
        "It is more detailed and in depth." (Visible=True)
        "It seems to be much easier to user." (Visible=True)
        "It's a little different and offers more information." (Visible=True)
        "It feels more intuitive, clear, and easy to understand." (Visible=True)
        "It is far more informative." (Visible=True)
        "It is more user-friendly." (Visible=True)
        "It has a lot more information compared to others." (Visible=True)
        17 more
    CQ 5, Topic 2: 17 quotes (14%)
        "It's very similar." (Visible=True)
        "It's similar." (Visible=True)
        "It's similar." (Visible=True)
        "It's similar." (Visible=True)
        "Similar" (Visible=True)
        "Similar" (Visible=True)
        "Similar" (Visible=True)
        10 more
    CQ 5, Topic 3: 7 quotes (8%)
        "I think it's better." (Visible=True)
        "It's better" (Visible=True)
        "It's better" (Visible=True)
        "It is better" (Visible=True)
        "It is slightly better" (Visible=True)
        "It's at least a thousand times better" (Visible=True)
        "It's nicer in my opinion." (Visible=True)

As can be seen, the generator creates a root finding that replicates the question. The root finding is present to give an analyst full context. Next, the findings include three discovered topics with the summary of each describing the order and size in terms of absolute quote counts and percentage of the population. The presentation allows the analyst to quickly organize insights like "26% of respondents feel it's better, with most of that group appreciating the amount of information and clear presentation" and "14% of respondents feel like the site is similar to others."

Example findings for a quantitative with qualitative follow up question (labelled CQ 4) may be as follows:
    Fourth, respondents were asked: "How much do you agree with the following statement: 'This page would help me start investing'" with a follow up of "Please explain your answer."
    45% selected "Agree"
        CQ 4, "Agree", Topic 1: 11 quotes (20%)
            "Gives great advice on how to invest" (Visible=True)
            "It has some good information and guidance for new investors" (Visible=True)
            "It's ripe with information and resources, seems like a good place to start for a new investor." (Visible=True)
            "It has a lot of good factors that make you want to invest" (Visible=True)
            "I agree that this page would help me start investing" (Visible=True)
            "It provides all of the basic resources that one would need to invest." (Visible=True)
            "I really think this page could inspire me to start investing." (Visible=True)
            4 more
        CQ 4, "Agree", Topic 2: 3 quotes (5%)
            "There's a lot of helpful tools and mentors to get started." (Visible=True)
            "It has information and tools to get started." (Visible=True)
            "It has tools to help me get started." (Visible=True)
    31% selected "Strongly Agree"
        CQ 4, "Strongly Agree", Topic 1: 9 quotes (24%)
            "It has a lot of great articles and videos to help with investing" (Visible=True)
            "It has information that helps me get started with an investment portfolio" (Visible=True)
            "It has everything I need to know before investing." (Visible=True) "The page offers advice from specialists that allow one to make thought out investments" (Visible=True)

As may be seen, the difference between the findings from the previous example is an additional layer of value segmentation. The root is comparable to the previous example with the addition of the follow up question. The root provides context for the findings. Next, the findings report includes nodes that communicate the distributions of the selected quantitative values. In the present example, 45% of respondents selected "Agree" and 31% of respondents selected "Strongly Agree." Below each of the selected values, the generator includes the discovered topics. The presentation allows analysts to quickly intuit statements such as "almost all respondents agree with the statement that the page would help them start investing, with most focusing on the quality of the presented information." In the present example, a product designer may quickly discern the strong points of a product's design. The report may further help isolate problematic areas based on the findings associated with other quantitative values, such as "Disagree" or "Strongly Disagree". Further, the findings may be fed to downstream processes or applications to present recommendations and/or trigger other actions as described further below.

3.2 Diagnostic Findings

In some embodiments, a diagnostic finding generator is configured to generate findings for diagnostic elements in a UX test. A diagnostic element may include questions or prompts for qualitatively describing and/or quantifying a particular facet of a user experience. For example, a diagnostic test may query or measure a respondent's first impression, engagement, ease of use, and/or other aspects of the respondent's experience with a product or service. The respondent may provide diagnostic quotes that describe the experience with the facet and/or a quantitative value quantifying the experience. Additionally or alternatively, quantitative values may be tracked by the system as a respondent is engaging with the product. For instance, the system may quantify the intuitiveness/ease of use of a product based on how long it takes the user to complete a task. Engagement may be measure by tracking time-to-first interaction, number of interactions, timing between interactions, and/or other metrics. Similarly, the system may monitor other interactions and track other metrics to quantify other facets of a user's experience with a product.

In some embodiments, a diagnostic finder maps diagnostic test results to a sentiment. With binary sentiment classification, a diagnostic test result may be mapped to positive or negative sentiment. Neutral sentiments may be mapped to either a positive or negative classification, depending on whether respondents tend to be overly positive or negative. In the former case, neutral sentiments may be remapped to the negative sentiment classification whereas in the latter case, neutral sentiments may be classified as positive. In other embodiments, neutral sentiment may have its own classification for purposes of generating the findings. Additionally or alternatively, other sentiment classifications may be used by the diagnostic finding generator.

The manner in which diagnostic finding generator determines sentiment may vary depending on the particular type of diagnostic response that is received. For qualitative data, the diagnostic finding generator may use a trained sentiment analysis model to predict the sentiment of the respondents quotation. A sentiment analyzer is a natural language processing (NLP) tool that analyzes and determines the sentiment expressed in a piece of text. Sentiment analysis involves using machine learning algorithms and semantic rules to identify whether the sentiment in the text is positive, negative, or neutral. A sentiment analyzer may classify the sentiment of the text using one of more of the following approaches:

Lexicon-based analysis: This approach uses pre-defined dictionaries or lexicons containing words and phrases that are associated with specific sentiments (positive, negative, or neutral). The sentiment of a text is determined by analyzing the frequency of positive, negative, and neutral words in the text.

Machine learning: This approach uses algorithms that are trained on a large dataset of labeled text to identify patterns and features that are indicative of sentiment. The features may include the tokens (words/phrases) in the text, the sequence/order of the words, adjacency of one word to another, the part of speech of a token, and/or other semantic/linguistic attributes of the text. The algorithm then uses these patterns to predict the sentiment of new texts.

Rule-based analysis: This approach involves using a set of rules or heuristics to identify the sentiment of a text. For example, a rule might state that a text containing words like "happy," "excited," and "joyful" is likely to have a positive sentiment.

Hybrid approaches: These approaches combine two or more of the above techniques to improve the accuracy of sentiment analysis.

If quantitative data is included in a test response, then the value may be used to determine sentiment. For example, if the user rates a facet of a user experience highly or strongly agrees with a positive statement about the facet, then the system may rate the sentiment as positive. Conversely, low scores or values may be mapped to a negative sentiment.

In some embodiments, the diagnostic finding generator segments diagnostic quotations by sentiment. Segmenting along sentiment allows for more intuitive topic discovery and finding summaries. Segmenting may further be performed by diagnostic (e.g., first impression, engagement etc.) However, it was found that themes often manifest across diagnostics. As a result, performing segmentation by diagnostic may lead to lower quality finding results, and the examples provided herein are not segmented by diagnostic.

Figure 6:
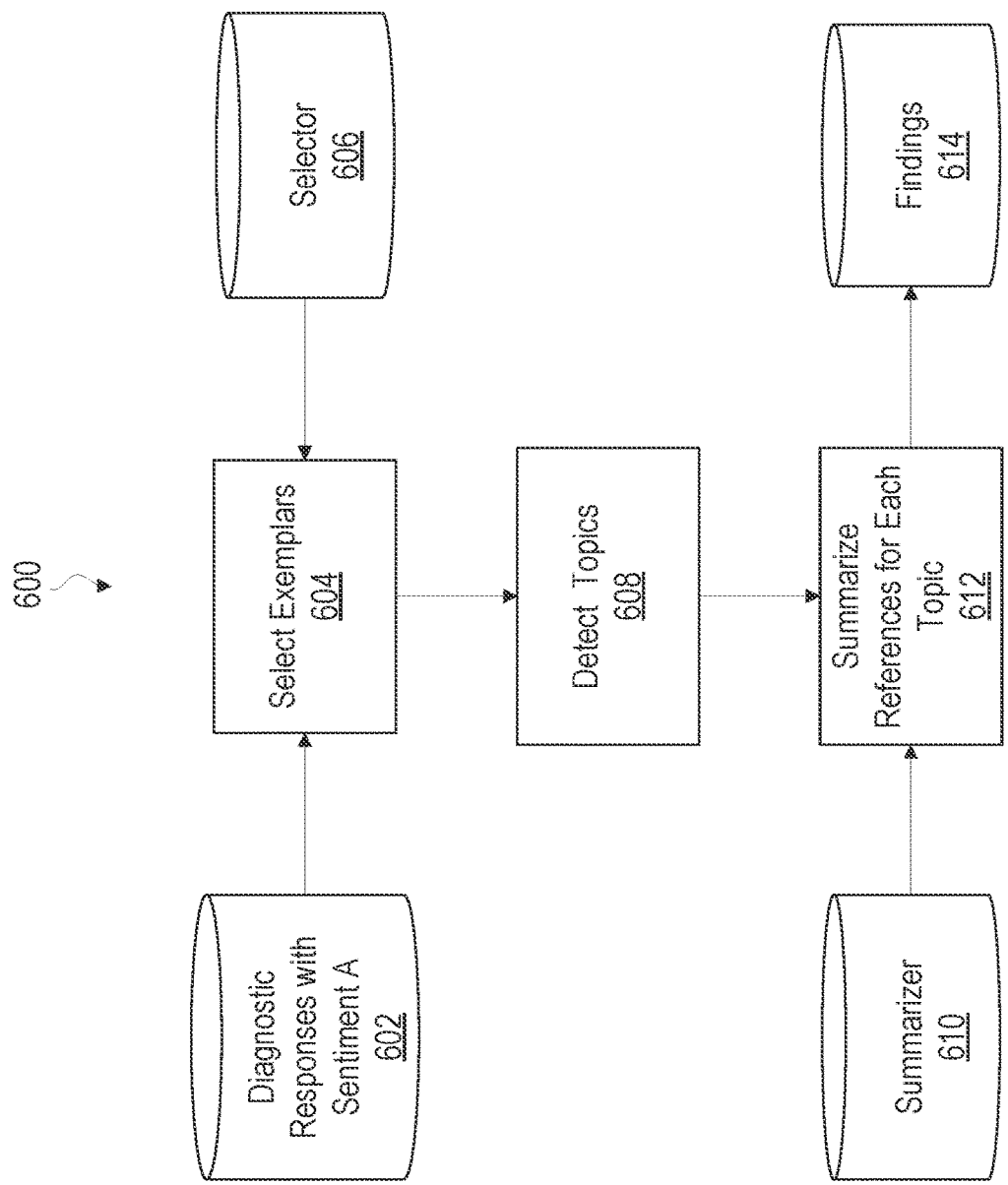
FIG. 6 illustrates an example dataflow diagram for generating diagnostic findings in accordance with some embodiments.

FIG. 6 illustrates example dataflow diagram 600 for generating diagnostic findings in accordance with some embodiments. Referring to dataflow diagram 600, a diagnostic finding generator receives diagnostic responses 602 which have the same sentiment classification (e.g., positive, negative). As previously noted, sentiment may be classified based on the quantitative values included with a diagnostic response and/or by using a sentiment analysis model as previously described.

Responsive to receiving diagnostic responses 602, selector model 606 is applied to select exemplars (operation 604). In some embodiments, selector model 606 is trained to be a two class classifier based on quotations starred by an analyst, product designer, or other user and/or quotations referenced in machine-generated key findings that have been labeled as selected. Techniques for training a selector are described further below in Section 6.1, titled Selector Training. The classifier may generate a selection score that represents an estimated quality or likelihood that the quotation would be selected for a given context. If the score Is larger than a defined minimum, then the quotation is retained. A minimum score set to a value that selects approximately 30% of incoming quotes has been found to yield high quality results. However, the minimum threshold may vary depending on the particular implementation.

In other embodiments, operation 604 may be omitted, and the process may use all diagnostic quotations to generate diagnostic findings. However, this approach was found to result in a large number of banal topics. To reduce extraneous topics that do not provide useful insights, a topic selection model may be trained and applied to select and retain only topics that satisfy a threshold selection score, though the selected topics may still include low-quality quotations, which may reduce the quality of a machine-generated finding. Thus, applying the selector model at the outset may improve the diagnostic finding generator's results.

Referring to dataflow diagram 600, the diagnostic finding generator next detects topics in the selected quotations (operation 608). Topic detection may use an embedding model that is pre-trained and/or fine-tuned, as discussed further below. The result of the topic detection is a set of quotations that are sorted and grouped based on common topics or themes predicted by the model. The quotations may be partitioned and sorted within memory based on the output of the topic prediction model to optimize further processing.

The diagnostic finding generator next applies summarizer model 610 which summarizes references for each topic (operation 612). The diagnostic finding generator then packages the results, including the output of the summarize model, as findings 614. As described further below, summarizer model 610 may be trained and/or fine-tuned to summarize references that follows a particular format and aesthetic specific to a particular user. By fine-tuning the model, the results that are generated may conform to a target format when added to an analyst's work queue and presented to the analyst for further review. As a result, the number of formatting corrections may be minimized. Any corrections that are made by the analyst may be fed back to the model for additional fine-tuning.

To illustrate the diagnostic finding generator operations, an example is described below for purposes of clarity. Given a set of input UX test results, the diagnostics finding generator may output the following findings:

Negative
    However, a small handful of prospective users are overwhelmed by the amount of content
        "There's too much clicking involved" (Diagnostics, Engaging)

"Too many clicks needed to jump around" (Diagnostics, Intuitive)

Positive

Potential students find that the pages are well-organized and easy to navigate

"I thought it was easy to navigate and informative" (Diagnostics, First Impression)

"It was an inviting website. I liked the explanation for students and parents" (Diagnostics, Engaging)

"I would say that the website was very engaging because I found the material to be quite interesting" (Diagnostics, Engaging)

"The website's design helped me to engage" (Diagnostics, Engaging)

"The website is very informative and easy to navigate" (Diagnostics, First Impression)

In the present example, the findings report includes root elements for each sentiment. Negative elements may be prioritized higher than positive elements since it generally provides more guidance on how to improve the product design. Under each sentiment, there are findings, each of which is composed as a styled summary where the style is learned from fine-tuning the model. Each finding includes a set of references that include a quotation and the source of the quotation. The source communicates the particular diagnostic (e.g., engaging, intuitive, first impression) from which the quote originated. In some embodiments, the findings generator may create hyperlinks for the quotes that link to the test results for the individual respondent who created the quote. Upon selecting the link, the browser or other client application used by the analyst to view the findings may open the results from the location pointed to by the hyperlink.

In some embodiments, the supporting references for a finding that are included in the findings report may be restricted to a threshold number. By placing a cap on the number of supporting references, clutter and the presentation of redundant information may be reduced. The manner in which the selection is made may vary depending on the particular implementation. In some embodiments, the finding generator may select the top n references with the highest selector score. Additionally or alternatively, other factors may be used for the selection. For instance, the generator may select quotes from different diagnostics such that the supporting references are evenly distributed across sources. As another example, the findings generator may select quotations based on uniqueness to minimize references that are substantially similar.

3.3 Expectation Findings

In some embodiments, an expectation finding generator is configured to generate findings for expectation elements in a UX test. An expectation element may include questions or prompts for qualitatively describing expectations of a user experience. The expectation element may further include a qualitative description and/or quantifiable value measuring an outcome of the expectation.

In some embodiments, expectation elements are associated with a theme schema that define expectation themes to which expectation elements may be mapped. A themer model may be trained and applied to predict a theme for a given expectation element and assign a theme classifier from the schema. Examples for building, training, and applying themer models are described in application Ser. No. 17/991,252, previously incorporated by references. Additionally or alternatively, expectation outcomes may be associated with a schema that defines available values for quantifying the outcome of an expectation. For example, a schema may include the values "Met", "Somewhat Met", and "Not Met". The theme and outcome schema values may be used to segment expectation elements and generate associated findings. The exact values within the schemas may vary from implementation to implementation.

Figure 7:
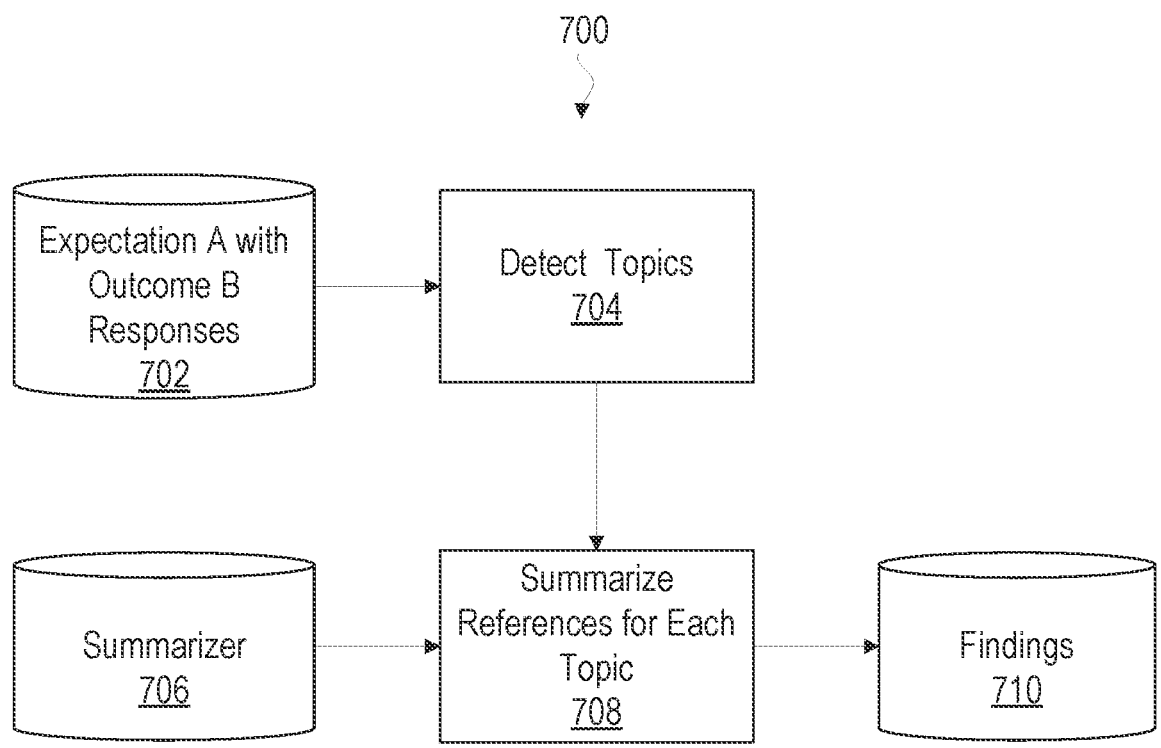
FIG. 7 illustrates an example dataflow diagram for generating expectation findings in accordance with some embodiments.

FIG. 7 illustrates example dataflow diagram 700 for generating expectation findings in accordance with some embodiments. Referring to dataflow diagram 700, an expectation finding generator collects responses 702 by theme (which may be estimated by a themer ML model) and outcome. The quotations may be partitioned and sorted along these dimensions within memory to optimize subsequent processing operations.

Responsive to collecting responses 702 for a given theme and outcome, a topic detection model is applied to further segment/partition the quotations by predicted topics (operation 704). As previously noted and discussed further below, the topic discovery model may comprise an embedding model that is pre-trained and/or fine-tuned using machine learning. The result of the topic detection is a set of quotations for the given theme and outcome that are sorted and grouped according to discovered topics. The quotations may be partitioned and sorted within memory based on the output of the topic prediction model to optimize further processing.

The expectation finding generator next applies summarizer model 706, which summarizes references for each topic (operation 708). The expectation finding generator then packages the results, including the output of the summarize model, as findings 710. As described further below, summarizer model 708 may be trained and/or fine-tuned to summarize references that follows a particular format and aesthetic specific to a particular user. By fine-tuning the model, the results that are generated may conform to a target format when added to an analyst's work queue and presented to the analyst for further review. As a result, the number of formatting corrections may be minimized. Any corrections that are made by the analyst may be fed back to the model for additional fine-tuning.

In the illustrated dataflow diagram 700, a selector model is not applied. The flow does not include quote selection because the theme-outcome grouping tends to reduce the population sufficiently to minimize noise. However, in other embodiments, a selector model may be applied to remove quotations that do not satisfy a threshold selection score.

To illustrate the expectation finding generator operations, an example is described below for purposes of clarity. Given a set of input UX test results, the expectation finding generator may output the following findings:

Easy to signup and use (71 quotes from 43 respondents)

Somewhat

While visitors are generally capable of completing the application, a few feel that the questions were confusing "Some parts were easy to understand." (Easy to signup and use, somewhat)

"The information was written in a way that can be easily understood" (Easy to signup and use, somewhat)

Met

The journey meets the expectations of 89% of respondents wanting an easy signup experience "The navigation was very intuitive" (Easy to signup and use, met)

"Web design was clear and easy to navigate." (Easy to signup and use, met)

"The website was easy to use." (Easy to signup and use, met)

"The site was very user friendly." (Easy to signup and use, met)

11 more

In the present example, the findings report includes a root element finding for a predicted expectation theme to which the expectation elements are mapped. The root finding further includes statistics on the distribution of quotes and respondents that were mapped to the theme. Under the root finding are sub-findings (child nodes) corresponding to different outcomes. In the present example, the sub-findings correspond to whether the root finding was somewhat met or fully met. A summary and set of references for topics are included for each theme-outcome combination. In the present example, only one topic is presented per theme-outcome combination. However, each theme-outcome combination may include a plurality of topics with corresponding summaries and references. As with the other examples, the supporting references may be hyperlinked to the corresponding UX test. Additionally or alternatively, the report may limit the number of supporting references to a threshold.

3.4 Heatmap Findings

In some embodiments, a heatmap finding generator is configured to generate findings for heatmap elements in a UX test. A heatmap element may include qualitative and/or quantitative data that is tied to a particular location of a webpage, application page, product image, or other set of content that is rendered within the display of a respondent. For example, the user may be prompted to click on locations within an image or page to input a rating and/or qualitative description of the area that was selected. The coordinates and quotes/quantitative data for the image and sentiment may be passed to independent instances of a heatmap generator. The generator may spatially cluster the clicks/selected area of the image and then discover-summarize topics in the quotes captured by each spatial cluster.

Figure 8:
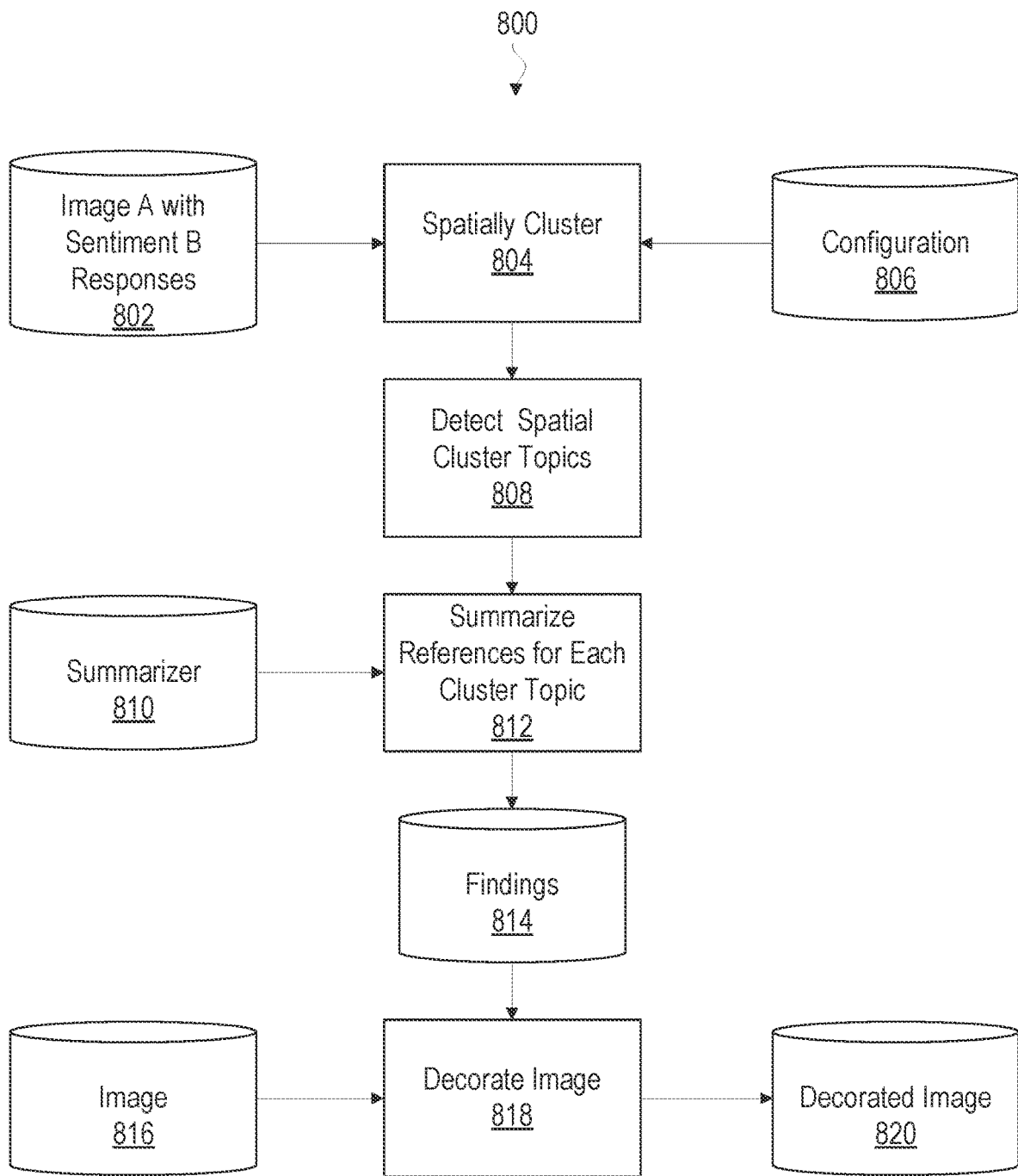
FIG. 8 illustrates an example dataflow diagram for generating heatmap findings in accordance with some embodiments.

FIG. 8 illustrates example dataflow diagram 800 for generating heatmap findings in accordance with some embodiments. Referring to dataflow diagram 800, a heatmap finding generator collects responses 802 for a specific image with a specific sentiment. The sentiment may be determined using a sentiment analyzer as previously discussed and/or based on quantitative values submitted by the respondent.

Responsive to collecting responses 802 for a given image and sentiment, the heatmap finding generator spatially clusters the quotations by coordinates of the respondent's click (operation 804). A "click" herein refers to a selection of a particular location using an input device such as a mouse, touchscreen, or other mechanism for selecting a point or area on an image rendered within the display of a computing device. A cluster model may use configuration parameters 806 to perform the spatial clustering operation.

In some embodiments, the spatial clustering model infers a minimum distance by estimating image dimensions. Next, the model agglomeratively clusters the quotations, using the distance as the stopping criteria. For example, the clustering algorithm may stop clustering if a cluster join with a minimum pairwise distance above the threshold minimum distance cannot be found. The result of applying the spatial clustering model is a set of clusters of quotations that are grouped by coordinate location and sentiment. Stated another way, the clustering algorithm assigns quotations that are approximately in the same region of the image that share a common sentiment to the same cluster.

The heatmap finding generator next applies a topic prediction model to detect spatial cluster topics (operation 808).

As previously noted and discussed further below, the topic prediction model may comprise an embedding model that is pre-trained and/or fine-tuned using machine learning. The result of applying the topic prediction model is a set of quotations for the given spatial cluster sorted and grouped according to discovered topics. The quotations may be partitioned and sorted within memory based on the output of the topic prediction model to optimize further processing.

The heatmap finding generator next applies summarizer model 810, which summarizes references for each spatial cluster topic (operation 812). The heatmap finding generator then packages the results, including the output of summarize model 810, as findings 814. As described further below, summarizer model 810 may be trained and/or fine-tuned to generate finding summaries that follow a particular format and aesthetic specific to a particular user. By fine-tuning the model, the results that are generated may conform to a target format when added to an analyst's work queue and presented to the analyst for further review. As a result, the number of formatting corrections may be minimized. Any corrections that are made by the analyst may be fed back to the model for additional fine-tuning.

In some embodiments, the heatmap finding generator further decorates image 816 based on findings 814 to generate decorated image 820 (operation 818). The decorated version of image 820 (or user interface) may include findings that are presented at the corresponding spatial coordinates of the cluster centroid for which the finding was generated. An analyst or other user may view the decorated image to view the spatially-based findings.

To illustrate the heatmap finding generator operations, an example is described below for purposes of clarity. Given a set of input UX test results, the heatmap finding generator may output the following findings:

Negative

Page 1, Location 1: "Not all sizes are available" (Respondent 401015)

"Not every size is available" (Page 1, Sentiment Map, Likes, Respondent 801618)

"Not all sizes are available" (Page 1, Sentiment Map, Likes, Respondent 202412)

"My size is not available" (Page 1, Sentiment Map, Likes, Respondent 602482)

"Sizes are not available" (Page 1, Sentiment Map, Likes, Respondent 100885)

6 more

Page 1, Location 2: However, respondents feel the notification about their expiring certificate is unnecessary "I don't like that kind of pressure" (Page 1, Sentiment Map, Likes, 600474)

"I don't like the pressure" (Page 1, Sentiment Map, Likes, Respondent 401074)

"Too much pressure" (Page 1, Sentiment Map, Likes, Respondent 555108)

"I usually don't like this kind of pressure but I find it easy to ignore" (Page 1, Sentiment Map, Respondent 802050)

Page 1, Location 3: However, a handful of users find the discount code section disrupts the page "The discount code is put randomly right in the middle of the page interfering with the design" (Page 1, Sentiment Map, Likes, Respondent 902351)

The coupon codes are distracting" (Page 1, Sentiment Map, Likes, Respondent 900479)

In the present example, the findings report includes a root element corresponding to the sentiment of the findings. Under the root element is the page location and finding. The first finding is a representative quote selected from a respondent. The second and third findings are generated using the summarizer model. Each finding includes a set of supporting references, which may be hyperlinked and/or capped to a threshold as previously discussed.

Figure 9:
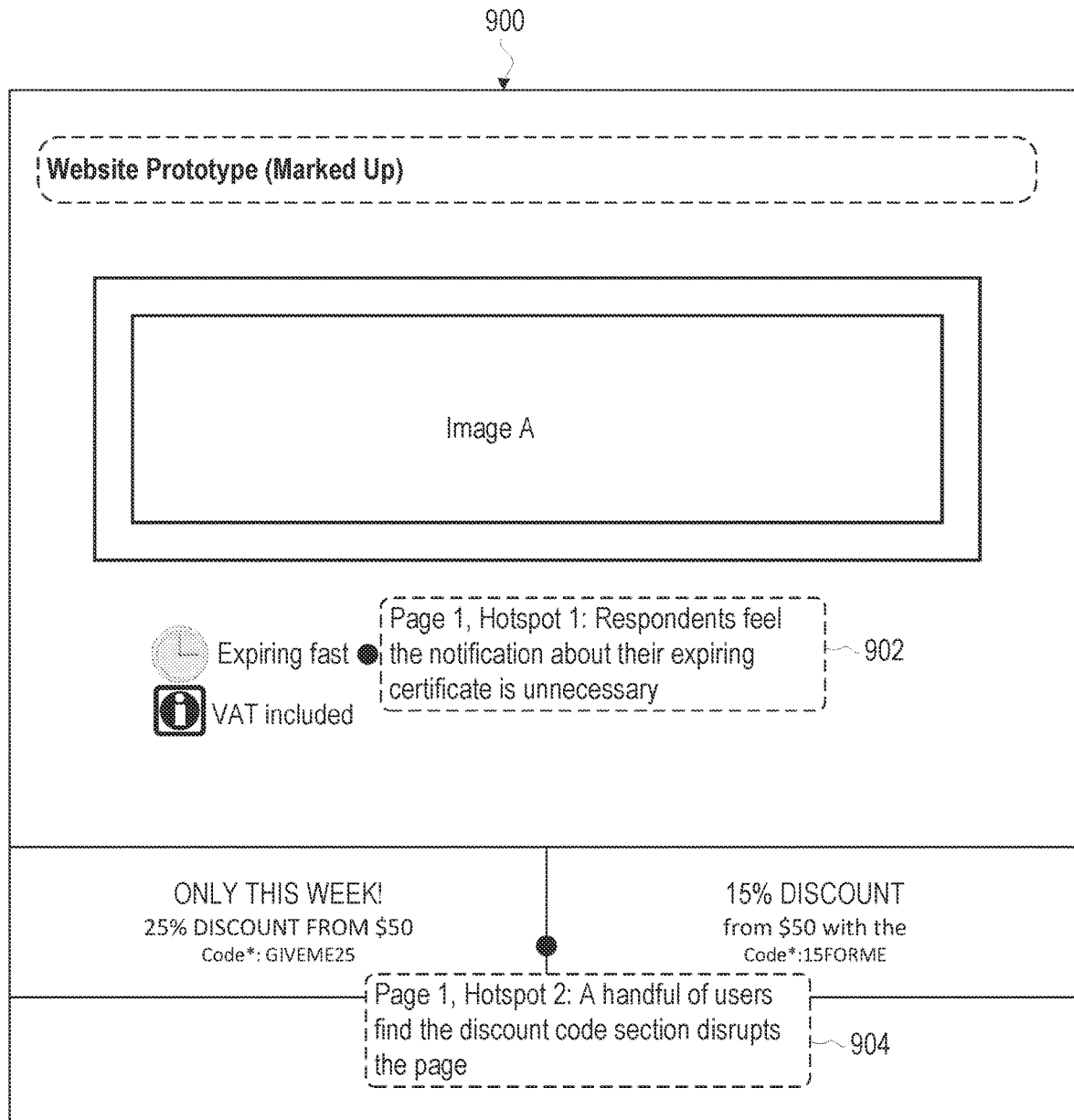
FIG. 9 illustrates an example user interface for viewing and interacting with heatmap findings in accordance with some embodiments.

As previously noted, the findings may be used to decorate an image or user interface. FIG. 9 illustrates example user interface 900 for viewing and interacting with heatmap findings in accordance with some embodiments. User interface 900 may correspond to a prototype website that is subject to the UX test. Page 1 of the website is decorated with two findings: finding 902 and finding 904, which are presented through dialogue boxes, although other user interface elements may be generated and rendered to decorate the image. Each finding is displayed adjacent to an anchor point corresponding to the coordinates of the centroid of the spatial cluster. Finding 902 indicates that users clicked on or around the area represented by the point and expressed concern that the expiring certificate is unnecessary. Finding 904 corresponds to a different location or region within the page where a handful of respondents indicated that the discount code section disrupts the page. The spatial cluster summaries may be presented with an identifying prefix to aide analysis. The decorated image may connect the discovered topics to regions on the image or user interface with which the respondents are interacting. The decorated image allows an analyst to quickly isolate the areas of the website that are detracting from the overall design, the reasons for the negative impact, and the steps to take to address the problem.

As previously noted, in some embodiments, the findings may be processed in an automated fashion to generate recommendations and/or trigger automated actions to address problems isolated within the findings report. In the present example, the recommendation engine may recommend removing the expiring certificate notification and/or move the discount to a different section of the page or a different page on the site. Additionally or alternatively, an AI-engine may generate proposed changes to the website based on the findings (e.g., by modifying the underlying source code of the webpage to remove the certificate notification and/or move the discount element to a different location that is predicted to be less obtrusive). The analyst may review the proposed changes via a client application, which may allow the user to accept the changes, make edits to the proposal, or reject the changes.

4. QUANTITATIVE SPLIT DRIVEN FINDING GENERATION

In some embodiments, finding generator 136 may use split driven quote segmentation to generate findings. Split driven quote segmentation may include creating a plurality of quote selection and evaluation permutations based on varying quantitative attributes and/or measures. For each permutation, finding generator 136 may calculate an in-out confidence interval. Finding generator 136 may then retain statistically significant and distinct permutations. Statistical significance may be determined based on the coverage of the confidence interval for a given permutation. Statistically significant and distinct permutations may be retained while the other permutations are discarded.

With respect to the retained permutations, finding generator 136 may then perform one or more consolidation operations. Consolidation may merge clusters together based on a set of consolidation criteria, which may be based on the selected permutation values, confidence intervals, and uniqueness of a segment relative to other segments. Consolidation may reduce the generated findings to a number that is more reasonably managed by an analyst while maintaining findings that represent internally consistent information with respect to the quote segment.

As with the non-split driven finding generation, finding generator 136 may instantiate different types of generators and/or execute different flows based on the type of UX test results for which quantitative split-driven findings are generated. In some embodiments, the generators include one for generating demographic and screener quantitative split findings and expectation quantitative split findings. Additionally or alternatively, other types of finding generators may be instantiated for other types of test elements (e.g., heatmap elements) where findings are driven through quantitative splits.

4.1 Demographic and Screener Quant Split Findings

In some embodiments, a demographic and screener quant finding generator generates findings by aggregating retained splits for diagnostics with the same selection criteria. For example, the finding generator may create the following result:

Respondents aged 18 to 44 believe the experience is less engaging, trustworthy, and valuable
Significance=0.75

The summary sentence may be dissected to facilitate understanding. The "aged 18 to 44" statement communicates that the collection of respondents in the subpopulation have an age in this range.

The "believe this experience is less engaging, trustworthy, and valuable" may be generated through a series of operations. The first step includes splitting the respondents into two groups using the "aged 18 to 44" criteria. The "in" group contains respondents with ages in this range (excluding those that do not satisfy the selection criteria), and the "out" group include respondents outside the range.

In some embodiments, the finding generator uses bootstrap sampling to estimate the "in" and "out" distributions of diagnostic scores (e.g., engaging, trustworthy, and valuable). Bootstrap sampling in this context is a statistical method which estimates the sampling distribution of the diagnostic scores based on a single sample or a limited number of samples. In this method, multiple samples of the same size are created by sampling with replacement from the original sample. The method simulates the process of drawing multiple samples from the population of respondents, using only the original sample. Each of the new samples may then be used to calculate statistics, such as the mean or standard deviation. The distribution of these statistics across the new samples may then be used to estimate the sampling distribution of the diagnostic score (e.g., the engagement score, trust score, etc.) for the "in" or "out" group.

The finding generator may then examine the overlap in the distributions of the "in" and "out" groups to determine the level of significance and directionality of the diagnostic scores. The directionality in this case may correspond to less or more (i.e., the "in" group is associated with lower or greater diagnostic scores than the "out" group). The level of significance may be determined by comparing distributions of the diagnostic scores. For example, if there is a significant overlap between the distributions of the two samples, then the differences between the means of the two groups is relatively small compared to the variability within each group. In this case, the level of significance of the diagnostic value is low. On the other hand, if there is little to no overlap between the distributions, then the differences between the means of the two samples is relatively large compared to the variability of respondents within the group. In this case, the diagnostic may be assigned a high level of significance to indicate that there is a significant difference between the "in" and "out" population of respondents for the given set of selection criteria.

The above process may be performed for each diagnostic across various selection permutations. The finding generator may aggregate retained splits for diagnostics with the same selection criteria. In the example above, the diagnostic "less engaging" for the "in" group is aggregated with the "less trustworthy" and "less valuable" diagnostics responsive to determining that the overlaps for the level of significance for these distributions satisfied a threshold for the same set of selection criteria. These three diagnostics also share the same direction (less). The remaining diagnostics associated with the selection criteria are not retained as the level of significance did not satisfy a threshold. As a result, the other diagnostics do not contribute to the finding associated with the selection criteria. The aggregate significance for the combined splits corresponds to the minimum level of significance of the retained splits (i.e., the level of significance for a retained split that is lowest amongst the aggregate group).

Based on the foregoing, the finding generator may rework the finding summary and significance as follows: "respondents aged 18 to 44 have engaging, trustworthy, and valuable diagnostic score distributions that are lower than other groups and are at least 75% different." However, the more abbreviated findings above are easier to parse. The exact format of the findings may vary depending on the particular implementation. As previously noted, the summarizer model may be fine-tuned to output finding summaries in a style preferred by the analyst or other user consuming the findings, which may include downstream applications.

Figure 10:
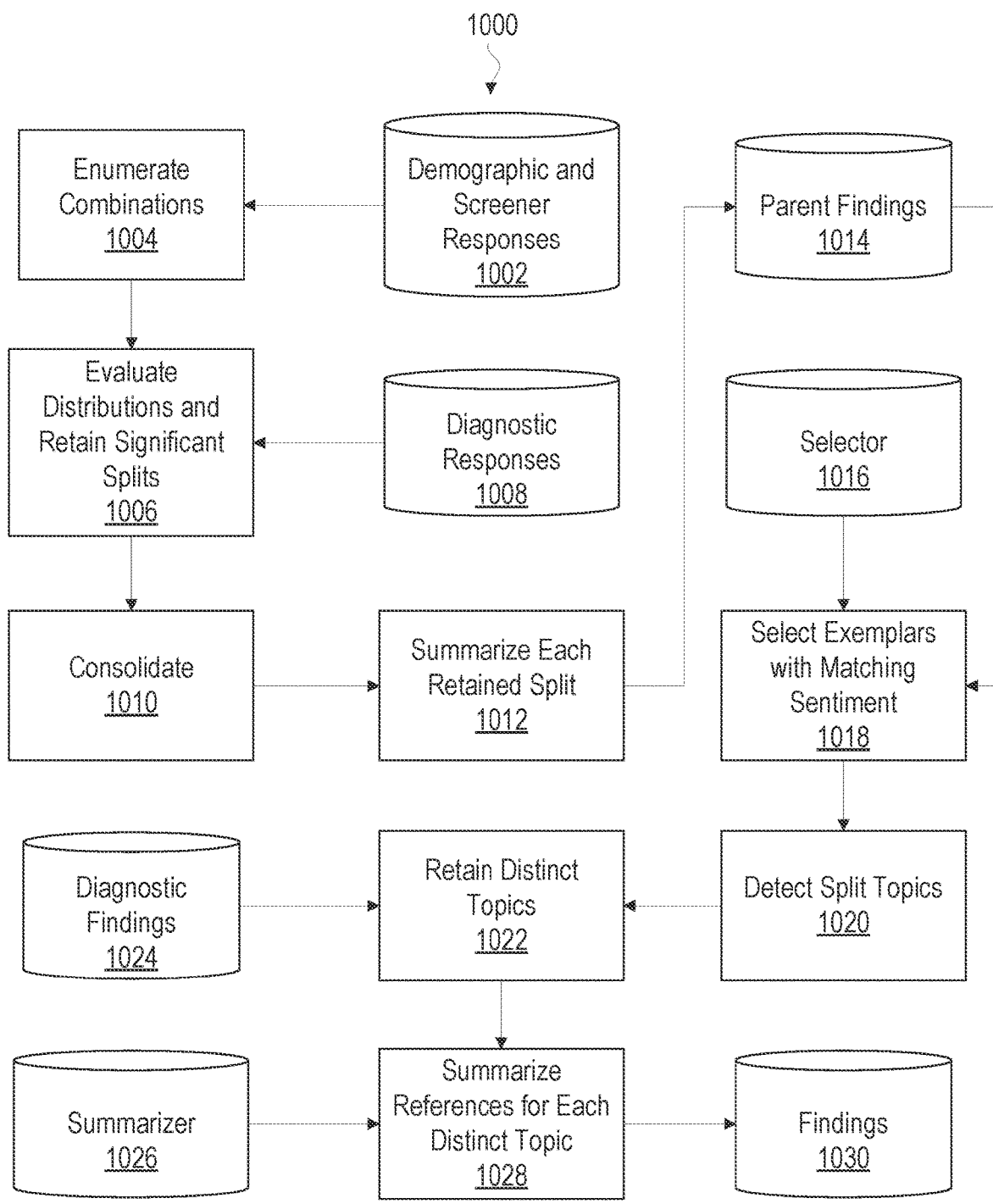
FIG. 10 illustrates an example dataflow diagram for generating demographic and diagnostic quantitatively split findings in accordance with some embodiments.

FIG. 10 illustrates example dataflow diagram 1000 for generating demographic and diagnostic quantitatively split findings in accordance with some embodiments. Referring to dataflow diagram 1000, the generator process receives responses 1002 to demographic and screener questions. A demographic question is one that prompts the respondent for demographic information such as age, sex, income, residence, or level of education. A screener question is a prompt for information to screen respondents before they are permitted to take a UX test. Screener criteria may be based on demographic and/or other information. For example, a screener question may prompt for information about what social media the respondent uses, what color the respondent's car is, what sports teams the respondent follows, and/or any other information that is used to screen accepted respondents.

Responsive to collecting responses 1002, the finding generator enumerates a set of combinations (operation 1004). The combinations of selection criteria may be computed based on the collected responses to the demographic and screener questions. For example, the generator process may collect all distinct values for each attribute and generate all selection combinations up to a threshold number of elements in length. A threshold of three elements was found to yield good results; however, the threshold may vary depending on the particular implementation. The number of unique combinations increases exponentially as the length of the elements increases. Thus, capping the number of elements may limit processing overhead while also restricting the number of findings to a more manageable level.

The finding generator may filter the set of combinations based on a set of filter criteria to optimize the quality of the findings. In some embodiments, the generator may filter combinations of values with non-adjacencies. For example, the combination of "18-24" and "35-44" for an age attribute may be discarded since the values of the attribute are not adjacent while the alternative combination of "18-24" and "25-34" may be retained. Additionally or alternatively, the finding generator may filter combinations that do not capture a threshold number of respondents (e.g., at least 30; the threshold may vary). Additionally or alternatively, other filters may be applied to discard combinations that are predicted to yield low-quality finding results.

In some embodiments, for each set of selection criteria that has not been filtered out, the generator process creates an instance for all relevant diagnostics. For each respondent selection criteria and diagnostic combination, the generator may use bootstrap sampling to estimate the diagnostic score distribution for "in" and "out" groups, where the "in" group includes only respondents having the unique combination of selection values for the created instance and the "out" group includes respondents that do not possess the combination.

In some embodiments, the distribution of the "in" and "out" groups corresponds to a confidence interval, which may be computed using bootstrap sampling. A confidence interval in this context refers to a range of values that is likely to contain the true values of a parameter for a set of UX test respondents, such as the mean or the proportion of respondents assigning a particular score to a diagnostic, based on a sample of data. Confidence intervals quantify the uncertainty or variability in estimates of population parameters. To calculate the confidence interval using bootstrap sampling, the finding generator may perform the following operations:

- Collect a random sample of size n from the UX test respondents having the selection criteria;
- Use the sample to calculate a point estimate of the diagnostic parameter, such as the sample mean or proportion assigning the diagnostic parameters a particular value;
- Resample with replacement from the original sample to create additional bootstrap samples of size n;
- For each bootstrap sample, calculate the same point estimate;
- Calculate the mean and standard deviation for the second group of bootstrap samples;
- Use the mean and standard deviation to calculate the confidence interval as follows:

$$CI = (\text{point estimate} - z^*SE, \text{point estimate} + z^*SE)$$

where CI is the confidence interval for the group, z is the z-score corresponding to a desired confidence level (e.g., 1.96 for 95% confidence), and SE is the standard error of the computed statistics for the bootstrap samples. In other embodiments, the confidence interval may be computed using an empirical percentile method, where the confidence interval is defined by the values at $\alpha/2$ and $1-\alpha/2$ percentiles of the bootstrap statistics, where $\alpha$ is the desired significance level (e.g. 0.05 for 95% confidence).

The generator process next evaluates the in-out distribution retaining only statistically significant splits (operation 1006). The level of significance may be determined by comparing the overlap between distributions (which may correspond to confidence intervals) of diagnostic responses 1008 for the relevant diagnostics with respect to the "in" and "out" groups as previously described. If the distributions are sufficiently different (i.e., the threshold level is satisfied), then the split is retained for further analysis. Otherwise, the split is discarded. The result of operation 1006 is a collection of respondent selection criteria that split individual diagnostics in a statistically significant manner.

In some embodiments, the generator process consolidates the retained splits (operation 1010). As previously noted, consolidation may reduce the number of findings to a number that is more reasonably managed by an analyst while maintaining findings that represent internally consistent information with respect to the quote segment. To consolidate the retained splits, the generator may execute one or more consolidation routines. An example embodiment includes three separate routine. First, the finding generator joins retained splits with exact selection criteria matches and consistent directionality (e.g., less or more). Second, the finding generator retains "best" and "worst" splits for each diagnostic, where "best" refers to the scenario when the "in" group is higher by the greatest amount than the "out" and vice versa for "worst". Additionally or alternatively, the finding generator may measure the magnitude of the split by the absolute difference in confidence interval edges for the highest tested significance (as determined by the p-value). The "best" and "worst" splits may be identified based on which has the highest absolute difference. The third consolidation includes comparing all remaining splits and recursively removing collisions, favoring larger splits. Additionally or alternatively, the finding generator may execute other consolidation routines and/or criteria to merge and/or remove retained splits.

Once consolidation is complete, the finding generator summarizes each of the retained splits (operation 1012). In some embodiments, the summarization at this operation is rule driven, rather than driven through ML models. The rules may be defined to concisely capture the respondent selection criteria, the diagnostics that are split, and the split's directionality. An additional element that may be included is a reference that communicates the minimum significance of the finding. Additionally or alternatively, an ML model, such as a summarizer, may be applied to generate a finding at this stage. The result is a set of parent findings 1014 that is created by the generator.

The following operations in dataflow diagram 1000 involve enhancing the root finding with topic discovery and more complex finding summaries. In some embodiments, selector model 1016 selects exemplars with matching sentiment (operation 1018). The selector model may be applied in a similar manner to the diagnostics generator described previously to obtain a smaller collection of high quality quotes.

Next, the finding generator applies the topic prediction model to discover topics in the retained quotations (operation 1020). In some embodiments, the topic quotations may be compared to the previously created diagnostic findings 1022. If there is overlap and it is not complete, then the split quotes are a subset of the overlapping diagnostic finding. As a result, the detected topic may be removed from consideration. The result is that the detected topic is not distinct to the captured respondents, and the previously captured diagnostic finding is sufficient. If there is overlap that is complete, then the previously computed finding is removed since the quantitative split framing is more specific and instructive.

The finding generator next applies summarizer model 1022, which summarizes references for each remaining topic (operation 1024). The finding generator then packages the results, including the output of summarize model 1022, into findings 1026.

An example quant split driven finding result is presented below. Given a set of input UX test results, the finding generator may output the following findings:

Respondents with high school diploma/GED, some college, or associate's degree believe the experience is more engaging, intuitive, and valuable.
Significance=0.8
Visitors appreciate that the email is easy to understand.
"Everything was in plain English and visible." (Diagnostics, Intuitive, Respondent 246421)
"They were simple and gave all the necessary information" (Diagnostics, Intuitive, Respondent 498019)
The availability of scholarships and the diverse curriculum are the most notable aspects of the page
"No cost, exceptional staff/teacher support, full gifted/honors program, social activities—my child would love the art club" (Diagnostics, Valuable, Respondent 810150)
"All the courses the school offers is great along with the school itself." (Diagnostics, Engaging, Respondent 597987)

In the present example, the findings report includes a summary for a root finding and a significance value. The finding has multiple children. Each child has the same form as the diagnostic findings that were previously discussed. These findings are topics that are discovered by the quotes captured by the demographics, screeners, diagnostics, and sentiment (e.g., less may correspond to neutral-negative sentiment and more may correspond to positive sentiment). Each topic may be checked for distinctness in captured quotes with the finding taking priority over diagnostic findings in the case of full overlap. As with the other examples, the supporting references may be hyperlinked to the corresponding UX test. Additionally or alternatively, the report may limit the number of supporting references to a threshold.

In some embodiments, the criteria for topic discovery may be different for each generator. Additionally or alternatively, the criteria may be different for different call types. For instance, in the previous example, the decoration for the finding type includes a respondent ID that uniquely identifies the respondent that submitted the quote. This decoration allows an analyst to understand the diversity of voices being captured. The generator may apply restrictions to findings report to a threshold number of quotes per respondent (e.g., the system may allow one quote per respondent to be used as a reference; the threshold may vary depending on the particular implementation). Applying such restrictions may help to call out the splitting conditions and capture respondent voices that are distinct to the collection. As a result, an analyst may more easily understand why the split occurs.

In some embodiments, the analyst may edit the findings reports through the user interface. For example, the analyst may remove topics, reword summaries, and change references. The feedback may be provided to the finding generator, which may use the feedback to fine-tune and/or retrain the underlying ML models, including the topic prediction model, selector model, and/or summarizer model.

4.2 Expectation Quant Split Findings

In some embodiments, an expectation quant finding generator generates findings by aggregating retained splits for expectation elements with the same selection criteria. The expectation finding generator may execute operations similar to the demographic and screener quant split finding generator with the exception that the respondent selection is defined by expectation theme and outcome.

Figure 11:
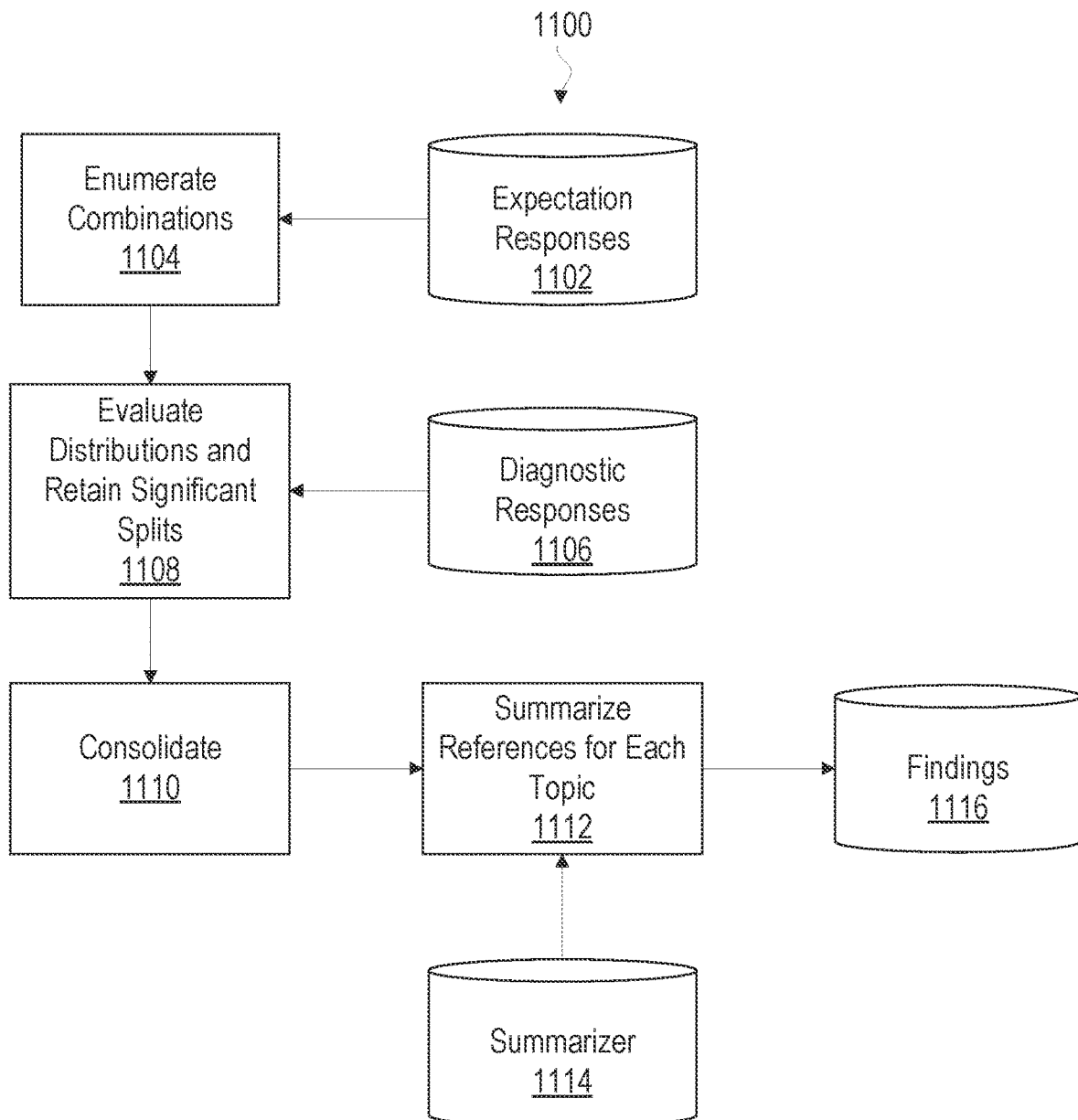
FIG. 11 illustrates an example dataflow diagram for generating expectation quantitatively split findings in accordance with some embodiments.

FIG. 11 illustrates example dataflow diagram 1100 for generating expectation quantitatively split findings in accordance with some embodiments. The finding generator collects expectation responses 1102 from a set of UX test results.

Once collected, the finding generator enumerates a set of combinations for selection criteria (operation 1104). The combinations of selection criteria may be computed based on the collected responses to the expectation questions. As with the demographic and screener quant split finding generator, the expectation quant split finding generator may collect all distinct values for each attribute and generate all selection combinations up to a threshold number of elements in length.

The generator process next evaluates the in-out distribution retaining only statistically significant splits (operation 1108). The generator may analyze the distributions of diagnostic responses 1106 (which may correspond to confidence intervals) for the relevant diagnostics with respect to the "in" and "out" groups as previously described. If the distributions are sufficiently different (i.e., the threshold level is satisfied), then the split is retained for further analysis. Otherwise, the split is discarded. The result of operation 1108 is a collection of respondent selection criteria that split individual diagnostics in a statistically significant manner. In other embodiments, the determination whether to retain a split or not may be based on the outcome values for an expectation. In this case, the overlap may be based on the estimated distribution of outcome values between the "in" and "out" groups.

In some embodiments, the generator process consolidates the retained splits (operation 1110). The finding generator may execute one or more of the consolidation routines previously described to join and/or remove splits from the retained set.

Once consolidation is complete, the finding generator detects topics for the remaining splits and applies summarizer model 1114 to summarize references for each topic (operation 1112). The summaries may be generated similar to the expectation findings described above albeit on a per split basis. The finding summaries may be linked to additional elements related to the quant split framework, such as the level of significance associated with the particular split to communicate the estimated distribution of the population of respondents that share a sentiment. The finding generator then packages the results, including the output of the summarize model into findings 1116.

An example quant split driven finding result is presented below. Given a set of input UX test results, the finding generator may output the following findings:
Negative
  Respondents with unmet or somewhat met "Will what I want be available" expectations believe the experience is less intuitive, trustworthy, and valuable
    Significance=0.75

The findings above include a root sentiment, which is related to the directionality of the split in this case rather than the outcome. The findings may be mapped to more specific feedback to guide product optimization. For example, the findings above may be used to recommend that increasing the amount of content on a website and assuring availability would improve the intuitiveness, trustworthiness, and value of the experience.

5. TOPIC DETECTION

Several of the example finding generator processes above applied a topic detection model. In some embodiments, a topic detection or prediction model receives a set of quotations and outputs a set of clusters that group the quotes by topic. The topic detection model may further build references to support the discovered topics and associated topic summaries.

In some embodiments, the topic detection/prediction model includes an embedding model that computes vector embeddings for each quote in the set of input quotes. An embedding model uses natural language processing methods to represent words as vectors of real numbers in a high-dimensional space, where the spatial relationships between the vectors reflect the semantic relationships between the corresponding quotations. The vector embeddings may capture the meaning of a quote based in part on context of the words contained therein. The assumption is that words that appear in similar contexts are likely to have similar meanings. By training a machine learning model on a large corpus of text, such as a collection of documents or a large database of web pages, the embedding model may learn to assign each quote a vector representation that captures its semantic meaning and relationship of words within the text.

An embedding model may be used to discover topics in a set of quotations by identifying patterns in the co-occurrence of words in the text. For example, topic discovery may include:
  Preprocessing: Clean the quotations and remove any stop words or punctuation marks that are not relevant to the analysis.
  Training an embedding model: Train an embedding model such as Word2Vec or MPNet, on the preprocessed quotations. Training the model may result in the creation of a high-dimensional vector representation of each word in the training corpus that captures its semantic meaning and relationship with other words in the text.
  Clustering: Apply clustering algorithms such as k-means or hierarchical clustering to group similar word vectors together. Each cluster can represent a topic in the set of quotations.
  Topic labeling: Assign labels to each cluster by examining the words that are most representative of that cluster. These labels can be used to describe the topic.
  Analysis: Analyze the distribution of the topics in the set of quotations and draw conclusions about the themes and ideas that are present in the text.

Figure 12:
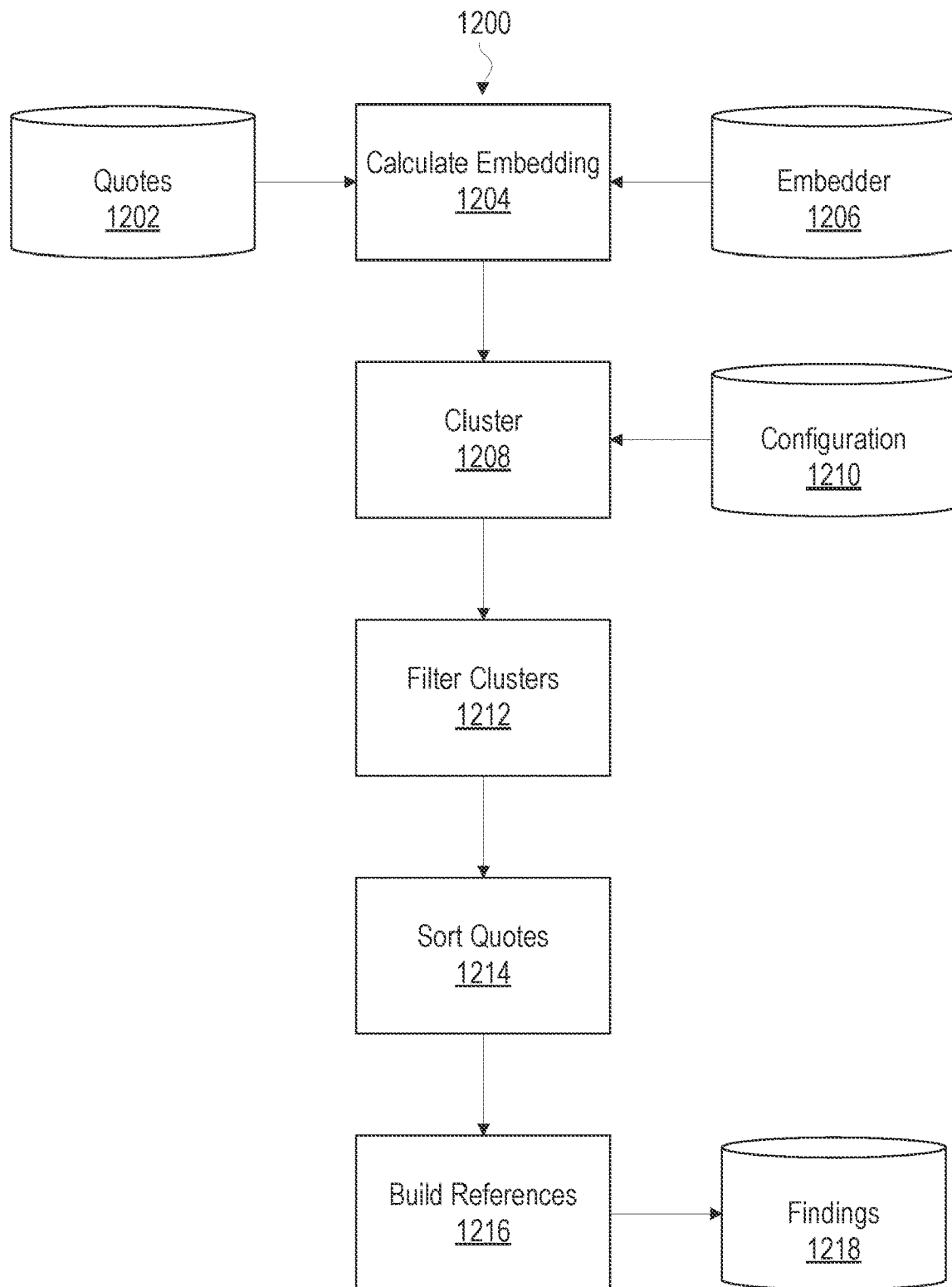
FIG. 12 illustrates an example dataflow diagram for generating and applying a discovery model in accordance with some embodiments.

FIG. 12 illustrates example dataflow diagram 1200 for generating and applying a discovery model in accordance with some embodiments. Referring to dataflow diagram 1200, quotes 1202 are received as input to the topic detection process. The process applies embedder model 1206 to calculate vector embeddings (operation 1204). As previously noted, the vector embeddings may be generated based on semantic features of a quotation such that quotations with similar meanings have vectors that are closer within the vector space than quotations with dissimilar semantic meanings.

Once the vector embeddings have been computed, the topic detection process applies a clustering model to cluster the quotes (operation 1208). The cluster model may use configuration parameters 1210 to perform the cluster operation. In some embodiments, the vector embeddings are clustered based on cosine similarity. The process may agglomeratively cluster the embeddings by recursively joining clusters whose minimum similarity satisfies a threshold, which may be a configurable value, and stopping clustering otherwise. However, the clustering algorithm that is used may vary from implementation to implementation.

In some embodiments, the topic detection process filters the set of clusters based on how many quotes are in each cluster (operation 1212). For example, the topic detection process may retain clusters that have a minimum threshold number of quotes. If a cluster does not include more than the minimum threshold, then it is indicative that the topic is not prevalent in the set of UX test results. Thus, the cluster may be discarded.

The topic detection process next sorts quotes for the retained cluster (operation 1214). In some embodiments, quotes are sorted from most to least similar relative to the cluster center. The center of a cluster may represent the mean captured quote embedding. The similarity may be determined using a cosine similarity function, which measures the cosine angles between two vectors.

After sorting the quotes, the topic discovery process builds references for each topic (operation 1216). A reference in this context is a quote that is decorated with context to establish provenance. For example, the quote may identify the diagnostic to which the quote is related, the respondent ID for the user submitting the quote, a question ID for the prompt that elicited the quote, and/or other contextual attributes associated with the source of the quote. Depending on the generator, the references may also be filtered to contain one respondent per cluster. Additionally or alternatively, for large clusters, the quotes after the $n^{th}$ quote may be summarized by "x more" as the top n may be sufficient to understand the topic. The threshold value for n may be configurable by an analyst or other end user viewing the findings. Each of the clusters are used to create a finding, and the topic and references are included as elements with findings 1218. The finding summary may be set to a default value as the method of summarization may be situation dependent.

6. MODEL TRAINING

The generators above may apply ML models to select quotes that support a finding and generate finding summaries. Generally, training is the process of teaching a machine learning algorithm to recognize patterns and relationships in data by feeding it large amounts of training data. The training data may include a set of input variables and the corresponding output variables. The training data may be constructed from historical UX test result and key findings, including historical finding summaries and reference quote pairs. The algorithm learns from the training data to make predictions or decisions when it is presented with new input data.

During the training process, the algorithm may adjust the internal parameters of an ML model to minimize the difference between its predictions and the actual outputs. The adjustments may be done through an iterative process where the algorithm makes predictions on the training data and the error between the predicted and actual output is calculated. The error is then used to update the model's parameters, and the process is repeated until the algorithm can make accurate predictions on the training data.

The target output of the training process is an ML model that can generalize well to new, unseen data, which means that it can make accurate predictions or decisions on data that it has not been trained on. Once the model has been trained, it can be deployed to perform quote selection or finding summarization. Specific techniques for training each model are described further in the subsections below.

6.1 Selector Training

Figure 13:
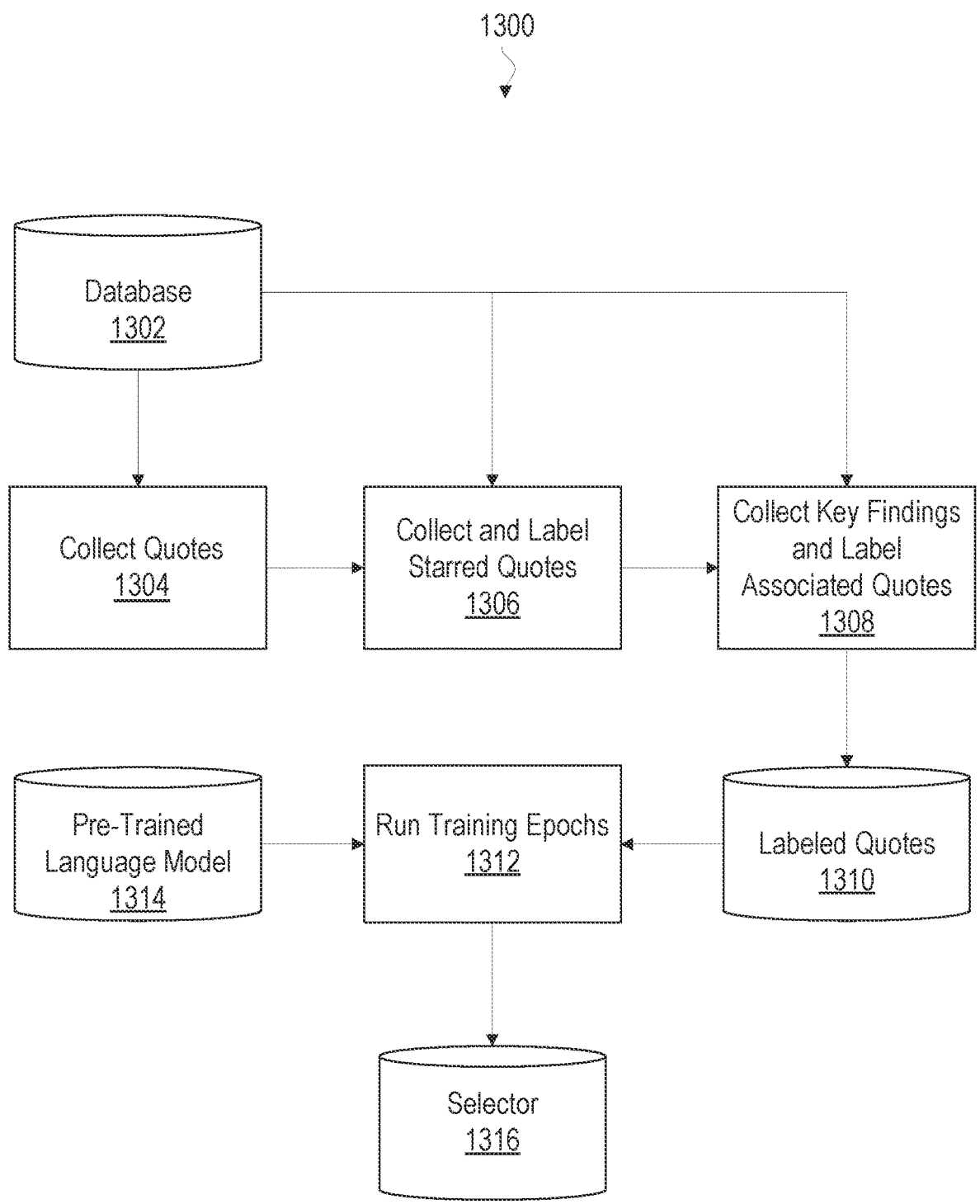
FIG. 13 illustrates an example dataflow diagram for training a selector model in accordance with some embodiments.

FIG. 13 illustrates example dataflow diagram 1300 for training a selector model in accordance with some embodiments. Referring to dataflow diagram 1300, the training process begins by collecting quotes from database 1302 (operation 1304). In some embodiments, the process collects quotes within a threshold timeframe, such as the last 12 months, and initializes the label for the quotes to be 0 or False. Quotes that are older than the threshold timeframe are not collected, allowing the model to "forget" older information.

The training process further collects and labels starred quotes (operation 1306). A starred quote in this context refers to one that was called out by an analyst, product designer, or other user. For example, an interface may allow the user to view quotes and select ones that the analyst views as high quality. Starred quotes are assigned a selection label of 1 or True. This operation allows the analyst to supervise the training process and inject domain knowledge into the system.

The training process further collects the text of the key findings and labels the associated quotes (operation 1308). The key findings may be associated with a summary, a set of quotes, and a set of supporting references as previously described. The training process may search for unlabeled quotes in the findings reports, marking the selection label of quotes that are found to be 1 or True. This operation allows for unsupervised labeling of quotes. The result is a sparsely labeled data set of quotes that were (selection label of 1) and were not (selection label of 0) deemed useful/high quality.

For each quote used in a key finding or starred, there may be other quotes that were not starred even though the quotes convey exactly or almost exactly the same information. Thus, the training process may be implemented with the assumption that only a subset of high-quality quotes receive special attention. Stated another way, the unlabeled quotes may not be useful for extrapolating patterns of low-quality results.

In view of the foregoing, in some embodiments, prior to training an ML model, the training process may boost the selected quote population by random sampling. For example, the selected quote population may be boosted to be at least 10% of the adjusted population of quotes. However, the threshold value may vary from implementation to implementation.

Additionally or alternatively, the training process may restrict the number of training epochs that are run. For example, the training process may restrict training to a single epoch, although the number of epochs may vary depending on the particular implementation. Restricting the number of training epochs influences the model to learn roughly what a selectable quote looks like but prevents the model from learning what each looks like in too much detail.

With reference to dataflow diagram 1300, the training process fine-tunes pre-trained language model 1314 by running one or more training epochs (operation 1312). In some embodiments, pre-trained language model 1314 is a neural language model, such as a generative language model. A generative language model is a type of AI algorithm that can generate natural language text that is similar to text written by humans. These models use statistical techniques to analyze and learn patterns in large datasets of text, which they then use to generate new text that is similar in style and content to the original data. Labeled quotes 1310 may conform to a preferred style, such as having a certain sentence structure and sequence of grammatical elements. Running training epochs (operation 1312) may tune the model to generate selection scores based on learned patterns in the training dataset, where a selection score represents a predicted quality or relevance of a quotation/UX test result.

An approach to fine-tuning a model, as illustrated, is transfer learning, which involves using a pre-trained model as a starting point and fine-tuning it using labeled dataset 1310. In transfer learning, the pre-trained model has already learned a set of features from a large dataset and these features may be used as a starting point for learning on a new, smaller dataset. Transfer learning allows for faster training and better performance than training a new model from scratch. Another approach for fine-tuning is performing a grid search, where a set of hyperparameters is specified and the model is trained and evaluated for each combination of hyperparameters. Once the optimal set of hyperparameters has been identified, the model may be trained on the entire labeled dataset using these hyperparameters.

In some embodiments, a training epoch corresponds to a single pass through the entire training dataset during the training of a model. In other words, an epoch is completed when the model has seen and processed every example in the training set once. During an epoch, the model iteratively updates its internal parameters, based on the gradients computed during forward and backward propagation steps, in an attempt to minimize the loss function. The loss function represents how well the model is performing on the training data, and the goal of the training process is to minimize this function to improve the model's accuracy on unseen data. During an epoch, the training data may be partitioned into multiple segments, and the training process may perform the forward and backward propagation steps for each segment. In other embodiments, an epoch may involve a single forward and backpropagation pass. The result of running one epoch is an update to the ML model's internal parameters based on the entire training dataset. The number of epochs used for training is a hyperparameter that can be adjusted to optimize the model's performance. As previously noted, increasing the number of epochs too much may lead to overfitting, where the model becomes too specialized to the labeled quotes and performs poorly on new data. Therefore, the number of epochs may be restricted to a relatively small number (e.g., one or two).

The result of the training and fine-tuning process is a trained selector model 1316. The internal parameters, such as cell weights, bias values, layers, neural node connections, and hyperparameter values may be stored as artefacts of the trained model. The trained model may be used for prediction on new, unseen quotes to generate a selection score corresponding to a level of quality or relevance predicted by the model.

6.2 Summarizer Training

Figure 14:
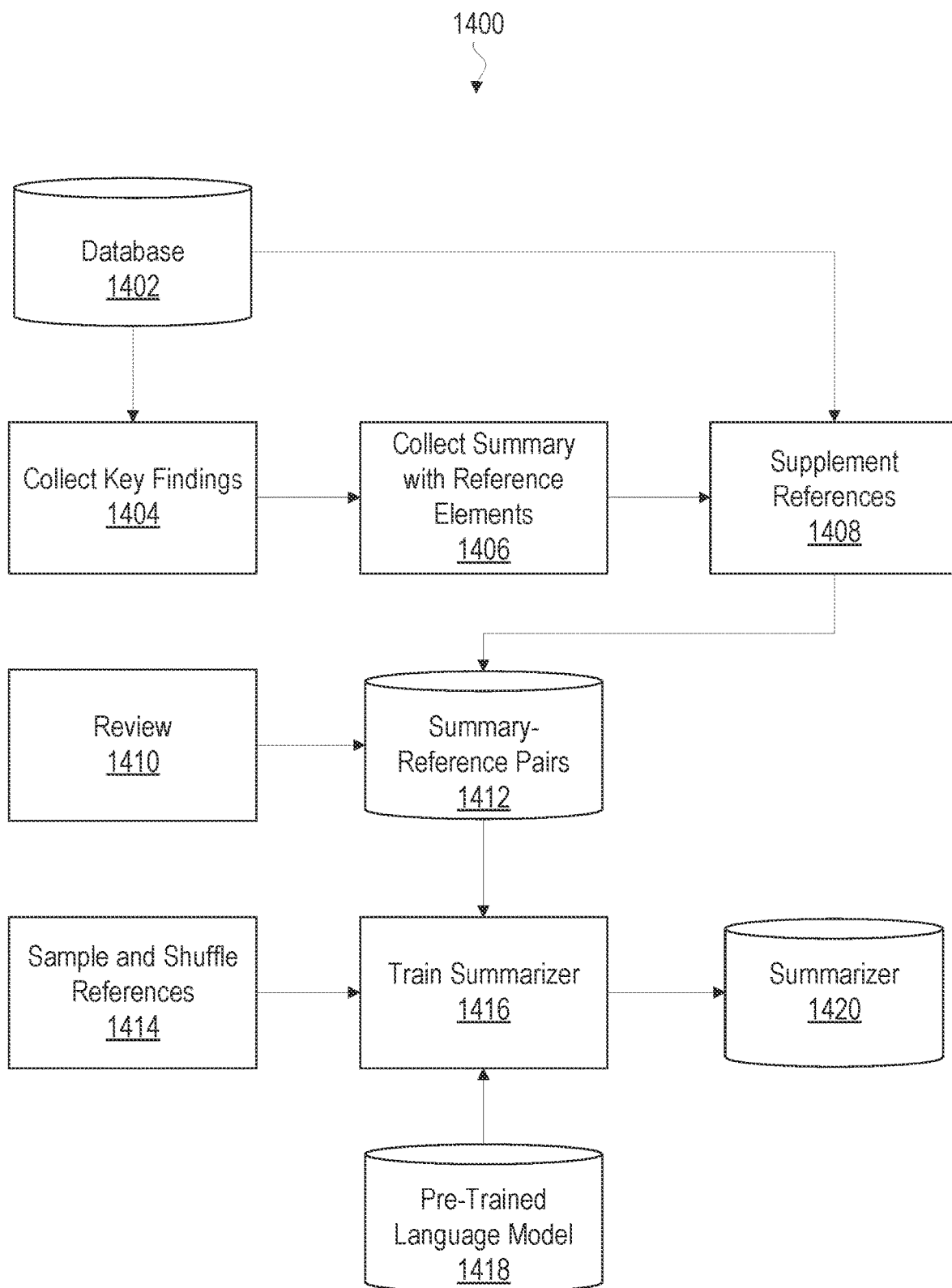
FIG. 14 illustrates an example dataflow diagram for training a summarizer model in accordance with some embodiments.

FIG. 14 illustrates example dataflow diagram 1400 for training a summarizer model in accordance with some embodiments. The training process may be designed such that the summarizer learns to produce results that conform to a style and/or state that is usable by an analyst and/or downstream applications. Referring to dataflow diagram 1400, the training process begins by collecting quotes from database 1402 (operation 1404). In some embodiments, the process collects quotes within a threshold timeframe, such as the last 12 months. Quotes that are older than the threshold timeframe are not collected, allowing the model to "forget" older information.

The training process further collects the key finding summary with reference elements (operation 1408). In some embodiments, a rule-based processing system is used to decompose each key finding into a flat collection of strings during this operation. Each string may then be decorated as being a quote containing references or not. If the quote contains references, then the processing system may parse the result to identify and collect the summary-references pairs.

When processing key findings, there may be a high level them and a handful of sub-themes with only one containing a referenced quote. The result of the parsing operation in this case would be a single summary-references pair. For example, an example key finding is presented below:

The app is a somewhat effective experience for respondents who are considering the company for wealth management services, receiving three below-benchmark diagnostic scores and two that are comparable to the average.

The experience effectively compels viewers to work with an advisor and clearly conveys what the relationship entails:

"It made me feel I could find an advisor that would attend to my particular situation and help me invest." (Diagnostics, First Impression)

Respondents value the personalized, expert advice that an advisor can provide and are curious about the opportunities to meet their goals.

However, users are seeking additional information, such as historic performance indicators and details about the fees.

The trusted brand lends credibility to the experience, but the email sign-up process is a friction point for viewers.

In the findings above, the summary may follow the format "The experience effectively . . . " and the references may be a single element list containing "It made me feel . . . " In other cases, a summary-references pair may include a list with a plurality of elements corresponding to different supporting quotes.

The reference quotes associated with a summary may have a level of randomness. In the previous example, the quote may be one that supports a point an analyst is trying to make, but there may be other quotes that might have been selected without changing the point. To make the summarizer more robust, the training process may supplement each summary-references pair with other sufficiently similar quotes (operation 1408). Stated another way, a finding may initially include a first set of one or more supporting references as part of a summary-references pair. The training process may then identify a second set of one or more additional supporting references to add to the summary-references pair even though the references were not previously included in the summary-references pair of the finding.

In some embodiments, the summary references pair is supplemented up to a threshold number of quotes (e.g., up to 5 quotes; the threshold may vary depending on the particular implementation). The similarity may be inferred by calculating the vector embedding of each reference, using the embedding model previously discussed, and taking the cosine similarity. The training process may apply a minimum similarity threshold (e.g., a minimum cosine similarity difference) to ensure that the model is not trained to make incorrect connections. Thus, the quotes that are used to supplement a reference are ones that have a threshold level of semantic similarity.

The quotes that are analyzed may be part of the same segment, UX test, page of a heatmap, or other group as the reference quote selected for the key finding. Restricting the search for semantically similar quotes to a particular segment shared by the original reference may reduce the number of cosine similarity computations that are performed while homing in on the most likely location of semantically similar test results. Once the supplemental quotes have been identified, they are added to summary-reference pairs 1412.

In some embodiments, the summary-reference pairs may be manually reviewed (operation 1410). A manual review may ensure that the training system does not include instances where the relationship between the summary and references is untenable. Manual review may be dependent on the type of finding that is being processed. With expectation elements, for instance, the summary may include statistics, and the reference may be there to provide one or more examples of a respondent voice in the quoted statistic. Thus, a manual review may ensure that the supplemental reference also fits the statistic. In other embodiments, the training process may proceed without manual review.

With reference to dataflow diagram 1400, the training process trains/fine-tunes a pre-trained language model 1418 by running one or more training epochs (operation 1416). In some embodiments, pre-trained language model 1418 is a neural language model, such as a generative language model. A generative language model is a type of AI algorithm that can generate natural language text that is similar to text written by humans. These models use statistical techniques to analyze and learn patterns in large datasets of text, which they then use to generate new text that is similar in style and content to the original data. The summaries from summary-reference pairs 1412 may conform to a preferred style, such as having a certain sentence structure and sequence of grammatical elements. Running the training epochs may tune the style to match that preferred by an analyst or other user.

In some embodiments, to robustly train a model, the training process generates versions of the supplemented summary-references pairs that capture the randomness of the anticipated capture scenarios. To obtain a sample of a training record, the training process may shuffle and randomly sample up to a threshold number of references from the pair and use it to construct an example prompt (operation 1414). For example, the training process may pick between 1 and 5 references to generate the prompt. The lower and upper limits for selecting the references may vary depending on the implementation and may be tuned as a model hyperparameter. The structure of the prompt to pre-trained language model 1418 is "summarize" followed by lines containing the sampled references in the order that the references were sampled. The random permutation influences the model to learn how to summarize to the same point given multiple possibilities of the selected quotes. The permuted data sets are then used to fine tune the language model, which is packaged as summarizer 1420. In some embodiments, the references that are not selected are not included in the prompt or used to fine-tune/train summarizer 1420. In other cases, the references may be excluded from a training epoch but used in another training epoch. The packaged summarizer may be applied/used by the finding generators as previously described. Additionally or alternatively, the summarizer may be applied to other collections of quotes, which may be useful in application where there is some randomness with the quotes referenced by summaries.

In some embodiments, pre-training the neural language model is performed using vast amounts of text data, such as text extracted from websites and social media posts. Pre-training allows the model to learn the patterns and relationships between words and sentences from a wide variety of sources, as well as the underlying meanings and concepts within the text.

After pre-training, the generative language model may be fine-tuned to generate new text that closely mimics the style and content of the findings reports. The trained/tuned model may be applied to a new set of quotations to generate a finding summary in the preferred style. The model may be fine-tuned by adjusting the model's hyperparameters and training it using summary-reference pairs 1412. Hyperparameters may include settings that determine how the model learns from the data during training, such as the learning rate, regularization strength, and number of hidden layers in a neural network. The process of fine-tuning a machine learning model may include trying out different combinations of hyperparameters and evaluating the model's performance on a validation set.

An approach to fine-tuning a model, as illustrated in dataflow diagram 1400, is transfer learning, which involves using a pre-trained model as a starting point and fine-tuning it using the shuffled and sampled references from summary-reference pairs 1412. In transfer learning, the pre-trained model has already learned a set of features from a large dataset and these features may be used as a starting point for learning on a new, smaller dataset. Transfer learning allows for faster training and better performance than training a new model from scratch. Another approach for fine-tuning is performing a grid search, where a set of hyperparameters is specified and the model is trained and evaluated for each combination of hyperparameters. Once the optimal set of hyperparameters has been identified, the model may be trained on the entire labeled dataset using these hyperparameters.

In some embodiments, a training epoch corresponds to a single pass through the entire training dataset during the training of a model. In other words, an epoch is completed when the model has seen and processed every example in the training set once. During an epoch, the model iteratively updates its internal parameters, based on the gradients computed during forward and backward propagation steps, in an attempt to minimize the loss function. The loss function represents how well the model is performing on the training data, and the goal of the training process is to minimize this function to improve the model's accuracy on unseen data. During an epoch, the training data may be partitioned into multiple segments, and the training process may perform the forward and backward propagation steps for each segment. In other embodiments, an epoch may involve a single forward and backpropagation pass. The result of running one epoch is an update to the ML model's internal parameters based on the entire training dataset. The number of epochs used for training is a hyperparameter that can be adjusted to optimize the model's performance. As previously noted, increasing the number of epochs too much may lead to overfitting, where the model becomes too specialized to the labeled quotes and performs poorly on new data. Therefore, the number of epochs may be restricted to a relatively small number (e.g., one or two).

The result of the training and fine-tuning process is a trained summarizer 1420. The internal parameters, such as cell weights, bias values, layers, neural node connections, and hyperparameter values may be stored as artefacts of the trained model. The trained model may be used for generate finding summaries for new collections of quotes and UX test results that have not previously been seen and were not used to train the summarizer model. Stated another way, the trained model may be applied to an input collection of quotes. In response, the trained neural language model outputs a summary of the quotes. In some embodiments, the model may further output one or more supporting references selected from the input collection of quotes.

In some embodiments, analysts may update summaries and/or references to provide feedback to the training process. For example, the analyst may reformulate a summary for a variety of reasons, which may include updating the style of the response and correcting the summary for semantic or grammatical errors. In response to the feedback, the process may use the correction to further train and fine-tune the model, iteratively re-executing the training and fine-tuning operations previously described. As part of the process, the corrected example may be added to a training dataset, and the training process may run one or more training epochs to update the model.

7. RECOMMENDATIONS AND ADDITIONAL APPLICATIONS

In some embodiments, the system may provide recommendations and/or trigger actions directed to optimizing a product based on the machine-generated findings. The recommendations and/or actions that are triggered may vary depending on the text of the finding summary, associated child findings, and/or associated references. For instance, responsive to detecting a finding that users would find the product more valuable and intuitive with a virtual try-on option, the system may present a recommendation to add a virtualization option to a product webpage that allows users to virtually try on a product. Recommendation engine 114 may parse a findings report to identify key findings and present the top recommended actions based on which findings are associated with a negative sentiment. Recommendation engine 114 may factor into the references to determine which course of action to recommend with respect to modifying the design of a product or service.

Additionally or alternatively, the system may populate an analyst's work queue with machine-generated findings. Analysts for third-party service providers often review the results of UX tests before sending synthesized results to the product design team which hired the analysts. The machine-generated findings report may reduce the analyst's workload and turnaround time by predicting and summarizing the topics most relevant to a product and hiding extraneous results. For example, an analyst may be presented with the top n key findings with supporting references rather than having to manually sift through thousands of results.

Additionally or alternatively, quotations may be sorted and presented by finding and selection score. For example, a list for a particular finding may be presented to an analyst may include quotations predicted to be the highest quality at the top with lower-quality quotes closer to the bottom. Quotations scored below a threshold selection score may be cutoff or presented at the end of the list. Thus, quotations that provide the most helpful insights may be presented more prominently than those with little or no useful information.

Additionally or alternatively, the findings report may be consumed by other downstream applications, which may process the data to perform additional analytics and/or trigger additional actions. For instance, downstream applications may search for patterns (e.g., using machine learning) in the selected finding summaries to formulate recommendations, and/or other analytic insights. The applications may further execute actions based on the set of findings such as updating user interface 104, functional elements 106, and/or aesthetic elements 108 in a manner that is predicted to improve the user experience test results.

8. COMPUTER NETWORKS AND CLOUD NETWORKS

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. MICROSERVICE APPLICATIONS

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

10. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 15:
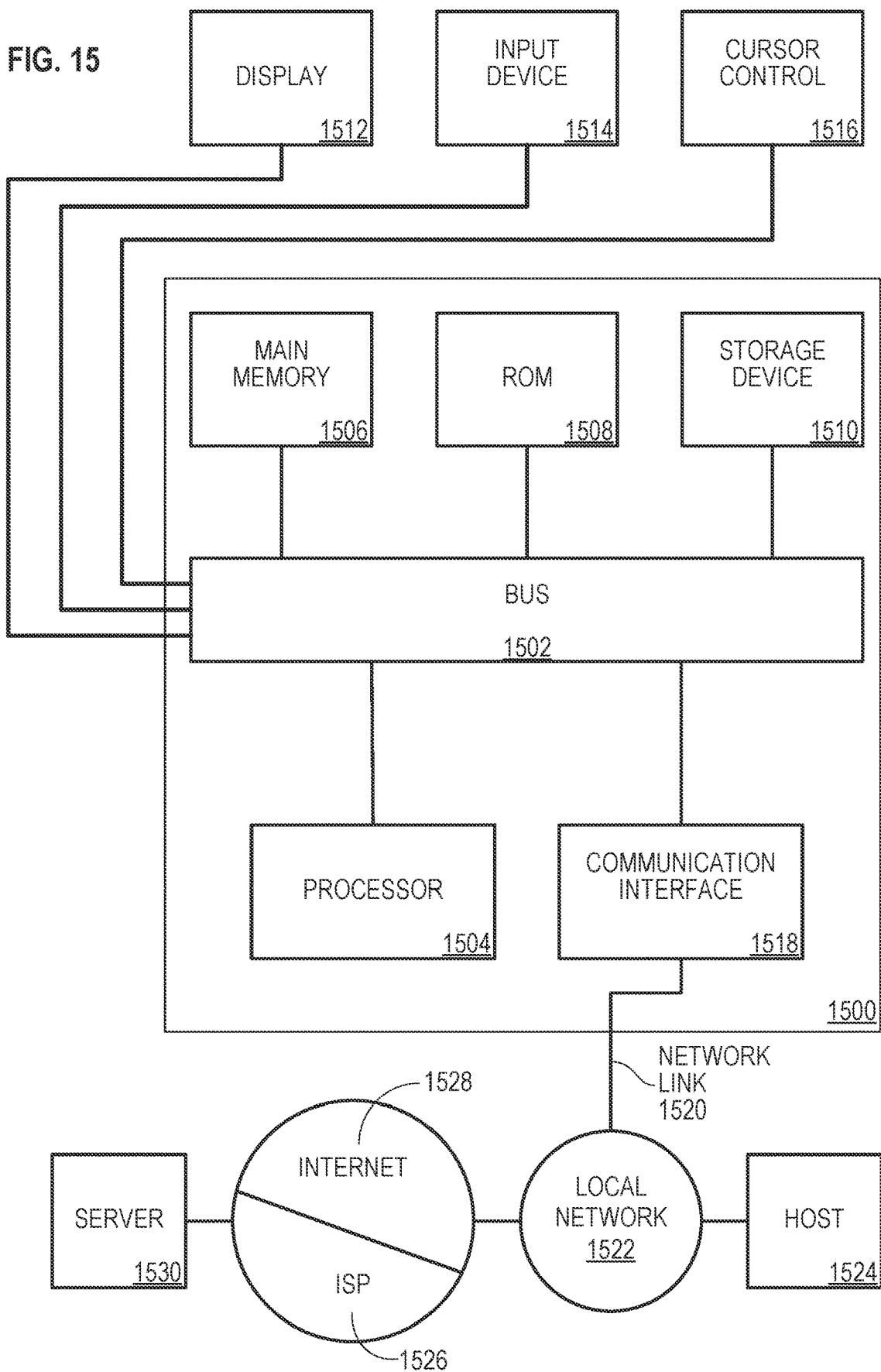
FIG. 15 illustrates a computer system in accordance with some embodiments.

For example, FIG. 15 illustrates a computer system in accordance with some embodiments. Computer system 1500 includes a bus 1502 or other communication mechanism for communicating information, and a hardware processor 1504 coupled with bus 1502 for processing information. Hardware processor 1504 may be, for example, a general-purpose microprocessor.

Computer system 1500 also includes a main memory 1506, such as a random-access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the worldwide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

12. MISCELLANEOUS; EXTENSIONS

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a set of findings associated with at least one user experience test, wherein at least a finding in the set of findings includes a summary of the finding and a first set of one or more references supporting the summary;
identifying, based on the first set of one or more references, a second set of one or more references that were not included in the finding and support the summary;
training a language model to generate summaries from a subset of sampled references based at least in part on the summary of the finding, the first set of references supporting the summary, and the second set of one or more references that were not included in the finding and support the summary.

2. The method of claim 1, wherein identifying the second set of one or more references comprises: searching for quotations from the at least one user experience test within a threshold level of similarity to at least one quotation in the first set of one or more references.

3. The method of claim 2, wherein the level of similarity is determined, based at least in part, on a cosine similarity of vector embeddings associated with the quotations from the at least one user experience test.

4. The method of claim 1, wherein training the language model comprises: randomly selecting up to a threshold number of references from the first set of one or more references and the second set of one or more references; and generating a prompt for training the language model using a subset of references from at least one of the first set of one or more references and the second set of one or more references that were randomly selected.

5. The method of claim 1, wherein training the language model comprises: tuning the language model to learn to summarize references according to a style associated with at least one analyst.

6. The method of claim 1, wherein the language model is a generative language model that includes; wherein training the language model comprises adjusting one or more hyperparameters of the generative language model based at least in part on a model output summarizing at least a subset of randomly sample references from the first set of one or more references and the second set of one or more references.

7. The method of claim 6, wherein the hyperparameters include at least one of a learning rate, regularization strength, or number of hidden layers in a neural network.

8. The method of claim 1, further comprising: receiving a new set of UX test results; and
applying the trained language model to a set of quotations extracted from the new set of UX test results to generate a finding summary for the set of quotations.

9. The method of claim 8, wherein applying the trained language model further identifies at least one reference that supports the finding summary.

10. The method of claim 1, further comprising: receiving a new set of UX test results; and
applying the trained language model to different groups of quotations extracted from the new set UX test results to generate a finding summary for each respective group of quotations, wherein the quotations are grouped by topic.

11. One or more non-transitory computer-readable media storing instructions which, when executed by one or more hardware processors cause:
receiving a set of findings associated with at least one user experience test, wherein at least a finding in the set of findings includes a summary of the finding and a first set of one or more references supporting the summary;
identifying, based on the first set of one or more references, a second set of one or more references that were not included in the finding and support the summary;
training a language model to generate summaries from a subset of sampled references based at least in part on the summary of the finding, the first set of references supporting the summary, and the second set of one or more references that were not included in the finding and support the summary.

12. The media of claim 11, wherein identifying the second set of one or more references comprises: searching for quotations from the at least one user experience test within a threshold level of similarity to at least one quotation in the first set of one or more references.

13. The media of claim 12, wherein the level of similarity is determined, based at least in part, on a cosine similarity of vector embeddings associated with the quotations from the at least one user experience test.

14. The media of claim 11, wherein training the language model comprises: randomly selecting up to a threshold number of references from the first set of one or more references and the second set of one or more references; and generating a prompt for training the language model using a subset of references from at least one of the first set of one or more references and the second set of one or more references that were randomly selected.

15. The media of claim 11, wherein training the language model comprises: tuning the language model to learn to summarize references according to a style associated with at least one analyst.

16. The media of claim 11, wherein the language model is a generative language model that includes; wherein training the language model comprises adjusting one or more hyperparameters of the generative language model based at least in part on a model output summarizing at least a subset of randomly sample references from the first set of one or more references and the second set of one or more references.

17. The media of claim 16, wherein the hyperparameters include at least one of a learning rate, regularization strength, or number of hidden layers in a neural network.

18. The media of claim 11, further comprising: receiving a new set of UX test results; and
applying the trained language model to a set of quotations extracted from the new set of UX test results to generate a finding summary for the set of quotations.

19. The media of claim 11, further comprising: receiving a new set of UX test results; and
applying the trained language model to different groups of quotations extracted from the new set UX test results to generate a finding summary for each respective group of quotations, wherein the quotations are grouped by topic.

20. A system comprising:
one or more hardware processors;
one or more non-transitory computer-readable media storing instructions which, when executed by the one or more hardware processors cause:
- receiving a set of findings associated with at least one user experience test, wherein at least a finding in the set of findings includes a summary of the finding and a first set of one or more references supporting the summary;
- identifying, based on the first set of one or more references, a second set of one or more references that were not included in the finding and support the summary;
- training a language model to generate summaries from a subset of sampled references based at least in part on the summary of the finding, the first set of references supporting the summary, and the second set of one or more references that were not included in the finding and support the summary.

* * * * *